(12) United States Patent
Kajiyama et al.

(10) Patent No.: US 7,399,932 B2
(45) Date of Patent: Jul. 15, 2008

(54) SEAT LOAD MEASURING APPARATUS

(75) Inventors: Hiroshi Kajiyama, Hikone (JP); Toshihiko Kobata, Omihachiman (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/727,129

(22) Filed: Mar. 23, 2007

(65) Prior Publication Data

US 2007/0209451 A1    Sep. 13, 2007

Related U.S. Application Data

(63) Continuation of application No. 10/644,042, filed on Aug. 20, 2003, now abandoned.

(30) Foreign Application Priority Data

Aug. 21, 2002   (JP) .............................. 2002-240096
Nov. 8, 2002    (JP) .............................. 2002-324758
Jul. 4, 2003    (JP) .............................. 2003-191694

(51) Int. Cl.
B60R 21/015    (2006.01)
G01G 21/00     (2006.01)

(52) U.S. Cl. ...................... 177/136; 177/144; 177/154; 73/862.041; 180/273; 280/735

(58) Field of Classification Search ................. 180/273; 280/735; 177/136, 144, 154–159, 184–189; 439/34, 521; 73/862.041
See application file for complete search history.

(56) References Cited

U.S. PATENT DOCUMENTS

| | | | |
|---|---|---|---|
| 3,949,822 A | 4/1976 | English et al. | |
| 4,815,984 A | 3/1989 | Sugiyama et al. | |
| 5,111,896 A * | 5/1992 | Porcari et al. | 177/16 |
| 5,841,741 A * | 11/1998 | Freeman | 360/71 |
| 6,050,835 A | 4/2000 | Henrion et al. | |
| 6,069,325 A | 5/2000 | Aoki | |
| 6,244,116 B1 | 6/2001 | Osmer et al. | |
| 6,323,443 B1 | 11/2001 | Aoki et al. | |
| 6,323,444 B1 | 11/2001 | Aoki | |
| 6,331,682 B1 * | 12/2001 | Hopkins et al. | 177/154 |
| 6,340,799 B1 * | 1/2002 | Hama et al. | 177/238 |
| 6,571,647 B1 | 6/2003 | Aoki et al. | |

(Continued)

FOREIGN PATENT DOCUMENTS

EP    0 990 565 A1    4/2000

(Continued)

*Primary Examiner*—Randy W Gibson
(74) *Attorney, Agent, or Firm*—Foley & Lardner LLP

(57) ABSTRACT

A seat load measuring apparatus which can be effectively adopted to various kinds of motor vehicles without requiring various load sensors having cables of different lengths according to the kinds of motor vehicles, thereby providing improved installation, maintenance and manufacturing benefits. A seat load measuring apparatus may include a connector of a load sensor is a male connector having terminals projecting downwardly. The entry of the male connector faces the open bottom of a protector. On the other hand, a cable to be connected to an ECU is provided with a cable-side connector. The cable-side connector is composed of a female connector which is detachable relative to the male connector. Therefore, the load sensor and the cable are detachable from each other, thereby achieving the adaptability of the load sensor and the connector casing a relative to various kinds of motor vehicles.

12 Claims, 18 Drawing Sheets

U.S. PATENT DOCUMENTS

| | | |
|---|---|---|
| 6,669,505 B2 | 12/2003 | Wisniewski |
| 6,772,056 B2 | 8/2004 | Mattes et al. |
| 6,841,741 B2 * | 1/2005 | Kajiyama ............ 177/144 |
| 6,943,695 B2 | 9/2005 | Kobata |
| 7,096,745 B2 * | 8/2006 | Kobata ............ 73/862.041 |
| 7,244,896 B2 * | 7/2007 | Honda et al. ............ 177/199 |
| 2002/0043789 A1 | 4/2002 | Lichtinger et al. |

FOREIGN PATENT DOCUMENTS

| | | |
|---|---|---|
| EP | 1 184 232 A2 | 3/2002 |
| GB | 2352525 | 1/2001 |
| JP | 6-270727 A | 9/1994 |
| JP | 11-304579 | 11/1999 |
| JP | 11-351952 | 12/1999 |
| JP | 2000-258223 | 9/2000 |
| JP | 2000-258233 | 9/2000 |
| JP | 2000-258234 | 9/2000 |
| JP | 2001-12998 | 1/2001 |
| JP | 2001-041813 | 2/2001 |
| JP | 2001-108513 | 3/2001 |
| JP | 2001-304949 | 10/2001 |

\* cited by examiner

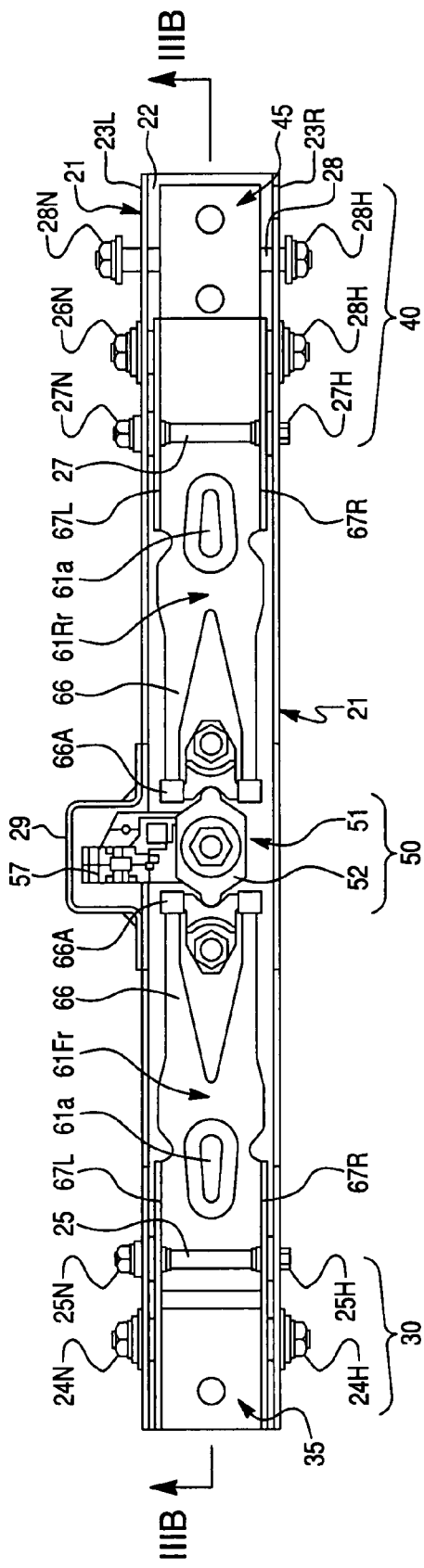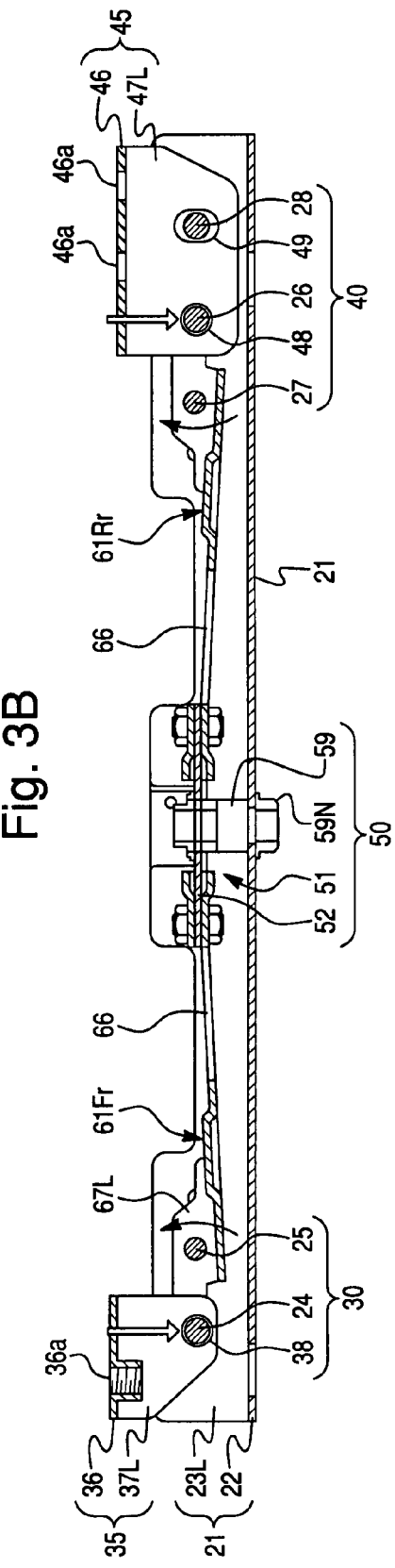

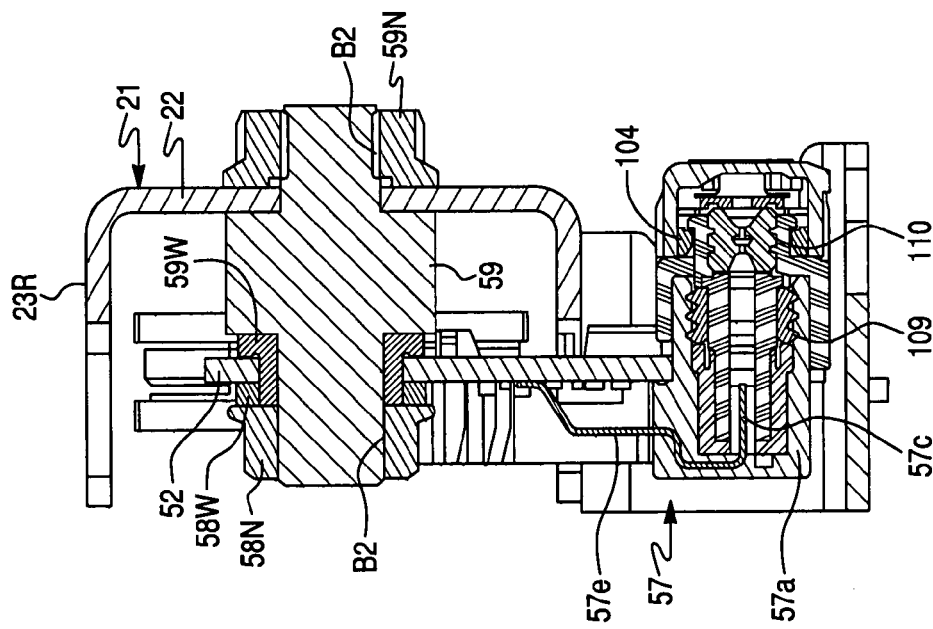
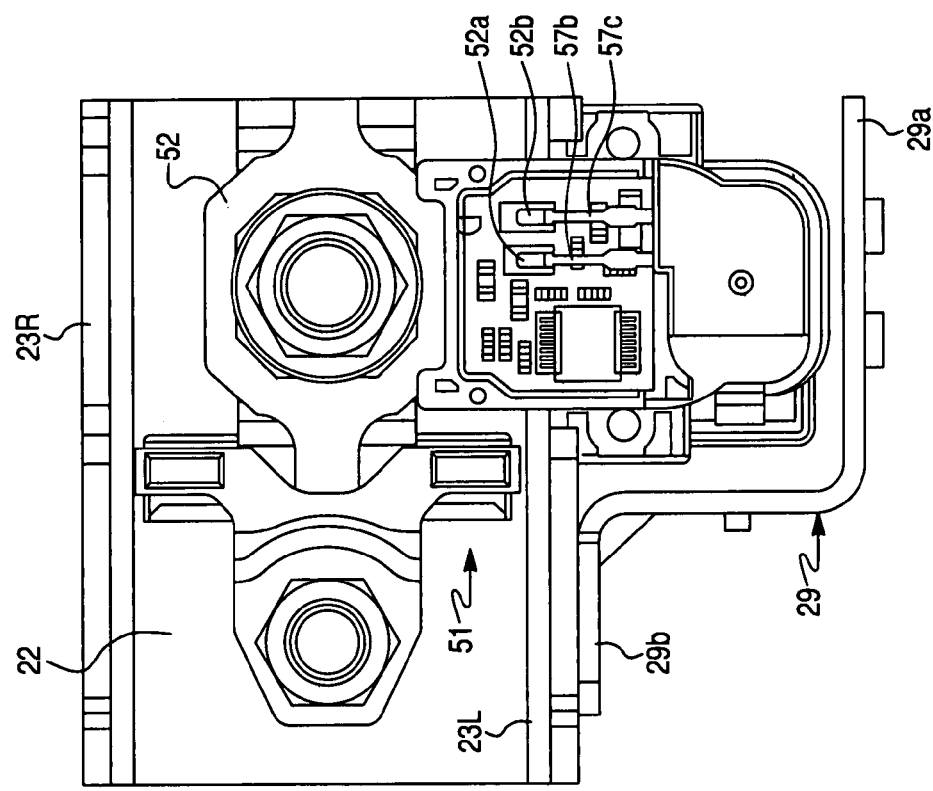

SEAT LOAD MEASURING APPARATUS

This application is a continuation application of U.S. application Ser. No. 10/644,042, filed Aug. 20, 2003.

BACKGROUND OF THE INVENTION

The present invention relates to a seat load measuring apparatus for measuring a seat load applied to a seat of a vehicle, such as an automobile, by the weight of an occupant sitting on the seat. Particularly, the present invention pertains to a seat load measuring apparatus which can be flexibly and effectively adopted to various kinds of motor vehicles.

A conventional automobile is equipped with seat belt devices and airbag devices. These devices are provided for restraining the inertial movement of occupants so as to protect the occupants in the event of an emergency such as a vehicle collision at which large deceleration is exerted on the vehicle.

The amount of the inertial force acting on the occupant depends on the weight of the occupant sitting on the vehicle seat. If the seat belt device and the airbag device are invariably controlled regardless of the weight of the occupant, it is difficult to make these devices effectively restrain the occupant in relation to the inertial force acting on the occupant. In recent years, there has been a proposal to control the actions of these safety devices based on the weight (body weight) of an occupant sitting in a vehicle seat in order to make the seat belt device and the airbag device restrain the occupant more effectively. For example, adjusting the amount of gas for deploying the airbag, the airbag inflating speed, and/or the magnitude of pretension of the seat belt depending on the weight of the occupant.

In order to control the actions of the seat belt device and the airbag device depending on the weight of the occupant sitting on the vehicle seat, it is necessary to measure the weight of the occupant. To achieve this, it has been proposed that a vehicle seat be provided with a seat load measuring apparatus for measuring the weight of an occupant sitting on the vehicle seat.

The seat load measuring apparatus requires load sensors for detecting the magnitude of load applied to the vehicle seat by the weight of the occupant. There are some seat load measuring apparatuses employing strain gauges as the load sensors (for example, see Japanese Unexamined Patent Publication No. H11-304579, Japanese Unexamined Patent Publication No. H11-351952, Japanese Patent Unexamined Publication No. 2001-304949) (both of which are incorporated by reference herein in their entireties).

Load sensors to be used for this purpose require a high degree of detection accuracy and adequate fracture strength. In general, the load sensor should have a detection accuracy that enables it to detect a load fluctuation of about 100 g in the gravitational direction. The accuracy must not be affected even when a load of 100 kg is applied in any direction other than the gravitational direction. In regards to the strength of the load sensor, it is required that the sensor effectively and securely withstand a large load in the event of a vehicle collision.

One problem frequently encountered is that in the event of a vehicle collision, large deceleration may act on a vehicle body so as to momentarily lift up the rear side of a vehicle seat where the seat load measuring apparatus is mounted.

For an apparatus with a strain gauge as a load sensor, the gauge, disposed on a sensor plate is deflected and deformed depending on the magnitude of load applied to the vehicle seat. The sensor plate is connected to a cable which connects to an electronic control unit (ECU) mounted on the vehicle so that a casing for the load sensor and the cable are united. However, different types of vehicles require the cable to be different lengths. Therefore, manufacturers must produce load sensors with varying cable lengths resulting in an increase in production costs.

Further, since the cable is attached to the load sensor, it is troublesome to mount the sensor plate to the body of the load sensor. As a result, such a seat load measuring apparatus is difficult to install, maintain and manufacture.

SUMMARY OF THE INVENTION

It is one of several objects of the present invention to provide a seat load measuring apparatus which can be adapted for use in various kinds of motor vehicles without requiring various load sensors to have cables of different lengths. Thus, the present invention provides improved compatibility and is more efficient to produce. Additionally, it is an object of the present invention to provide an inexpensive seat load measuring apparatus, which can be adapted for use in various kinds of motor vehicles that also withstands a large load applied to the mounting portion of the seat load measuring apparatus due to the lifting of the rear side of the vehicle seat.

In the following description of the various embodiments of the present invention, the forward, backward, leftward, rightward, upward, and downward directions correspond to the forward, backward, leftward, rightward, upward, and downward directions of a vehicle.

A seat load measuring apparatus according to one embodiment of the present invention includes a load sensor detecting a load which is applied to a vehicle seat by an occupant sitting on the vehicle seat; a control unit for calculating the load applied to the vehicle seat on the basis of a detection signal of the load sensor; and a cable connecting the load sensor and the control unit to transmit the detection signal of the load sensor to the control unit, and is characterized in that the load sensor has a distortion member which is distorted due to the load applied on the vehicle seat, strain gauges for detecting the distortion of the distortion member, and a sensor-side connector connected to the strain gauges, and the cable has a cable-side connector which is detachably connected to the sensor-side connector.

A seat load measuring apparatus according to one embodiment of the present invention further comprises a base frame which is fixed to a vehicle floor or a lower member of the vehicle seat and on which the load applied on the vehicle seat acts, the load sensor being disposed on the base frame, wherein the base frame is provided with a protector for protecting at least a part of the load sensor including the sensor-side connector, the protector is open in at least one side in any of the vertical direction, the longitudinal direction, the lateral direction, the diagonal direction from upper front to lower back or from lower front to upper back, the diagonal direction from upper left to lower right or from lower left to upper right, and the diagonal direction from forward left to backward right or from backward left to forward right in a state mounted to the vehicle, and the entry of the sensor-side connector faces the open side of said protector.

According to one embodiment of the present invention the protector is formed by bending a band-like plate to have a protecting portion surrounding at least a part of the load sensor including the sensor-side connector, and mounting portions to be attached to the base frame.

According to one embodiment of the present invention the seat load measuring apparatus further comprises front-side and rear-side rail brackets which are disposed near the front and rear ends of the base frame, respectively, and are connected to a seat rail which slides in the longitudinal direction of the vehicle; and arms which are disposed on a front portion and a rear portion of the base frame, respectively to extend in the longitudinal direction and each of which is provided at its one end with a press portion for transmitting force to said strain gauges and at its other end with a connecting portion relative to each rail bracket, and wherein protective mechanisms are disposed around the front and rear rail brackets, respectively, and when the load applied between the base frame and said rail brackets exceeds a predetermined value, the protective mechanisms directly transmit the excessive load between the base frame and the rail brackets not through the arms, and the protective mechanism at the rear-side rail bracket is provided with a reinforcing member for providing reinforcement against the load in a direction of lifting the base frame.

According to one embodiment of the present invention a cable for connecting a load sensor and a control unit can be designed to be detachable by employing a sensor-side connector and a cable-side connector, thereby achieving the adaptability of the load sensor and the connector casing relative to various kinds of motor vehicles. The only preparation required is configuring a cable having a length corresponding to the kind of motor vehicle. Therefore, the seat load measuring apparatus can be easily and inexpensively adopted to various kinds of motor vehicles.

According to one embodiment of the present invention, by utilizing an opening of a protector which is formed in at least one side in any of the vertical direction, the longitudinal direction, the lateral direction, the diagonal direction from upper front to lower back or from lower front to upper back, the diagonal direction from upper left to lower right or from lower left to upper right, and the diagonal direction from forward left to backward right or from backward left to forward right, the load sensor can be effectively protected and the connection and disconnection between the load sensor and the cable can be facilitated. Moreover, it is not required to form hole(s) and groove(s) for insertion of the cable-side connector, thus further simplifying the manufacture and reducing the cost.

According to one embodiment of the present invention, the sensor-side connector and the cable-side connector can be delivered in the connected state. In addition, since the connectors are allowed to be connected during the assembly of a vehicle body by a car manufacturer, the connectors can be delivered separately. Moreover, the flexibility during manufacturing process is improved. In this manner, an inexpensive seat load measuring apparatus which can be effectively adopted in various kinds of motor vehicles and is easier to install, maintain and manufacture.

Further, according to one embodiment of the present invention, the protector is formed just by bending a band-like plate. Therefore, the protector can be easily and inexpensively formed. Furthermore, according to one embodiment of the present invention, a protective mechanism is provided so as to effectively withstand large load exerted on the mounting portion of the seat load measuring apparatus disposed between a vehicle seat and a vehicle floor by a moment in a direction of lifting the rear portion of the vehicle seat.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 3(A), 3(B) show the seat load measuring apparatus of one embodiment of the present invention in the assembled state thereof, wherein FIG. 3(A) is a plan view thereof and FIG. 3(B) is a sectional view taken along a line IIIB-IIIB of FIG. 3(A).

FIGS. 6(A), 6(B) show a rear end portion of the seat load measuring apparatus of one embodiment of the present invention, wherein FIG. 6(A) is an exploded view thereof and FIG. 6(B) is an assembled view thereof.

FIGS. 7(A), 7(B) show a bolt mounting portion of the seat load measuring apparatus of one embodiment of the present invention, wherein FIG. 7(A) is an enlarged sectional view taken along the axis of a front stopper bolt and FIG. 7(B) is an enlarged sectional view taken along the axis of a pivot bolt.

FIGS. 9(A), 9(B) show an example of a rear end portion of a base frame of a seat load measuring apparatus as a comparative example relative to one embodiment of the present invention, wherein FIG. 9(A) is a side sectional view showing the normal state and FIG. 9(B) is a side sectional view showing a state after a force in a direction of lifting the seat is exerted.

FIGS. 10(A), 10(B) show the rear end portion of the base frame of the seat load measuring apparatus of one embodiment of the present invention shown in FIG. 2, wherein FIG. 10(A) is a side sectional view showing the normal state and FIG. 10(B) is a side sectional view showing a state after a force in a direction of lifting the seat is exerted.

FIGS. 16(A)-16(D) show a variation example of the rear end portion of the base frame of one embodiment of the present invention shown in FIGS. 10(A), 10(B), wherein FIG. 16(A) is a side sectional view showing the normal state, FIG. 16(B) is a sectional view taken along al line XVIB-XVIB of FIG. 16(A), FIG. 16(C) is a side sectional view showing a state after a force in a direction of lifting the seat is exerted, and FIG. 16(D) is a sectional view taken along a line XVID-XVID of FIG. 16(C).

FIGS. 17(A)-17(D) show another variation example of the rear end portion of the base frame of one embodiment of the present invention shown in FIGS. 10(A), 10(B), wherein FIG. 17(A) is a side sectional view showing the normal state, FIG. 17(B) is a sectional view taken along al line XVIIB-XVIIB of FIG. 17(A), FIG. 17(C) is a side sectional view showing a state after a force in a direction of lifting the seat is exerted, and FIG. 17(D) is a sectional view taken along a line XVIID-XVIID of FIG. 17(C).

FIGS. 19(A), 19(B) show a variation example of the sensor portion of the seat load measuring apparatus, wherein FIG. 19(A) is a partial plan view similar to FIG. 12 and FIG. 19(B) is a sectional view similar to FIG. 13, taken along a line XIXB-XIXB of FIG. 19(A).

DETAILED DESCRIPTION

One of many embodiments of the present invention will be described below with reference to the drawings.

Figure 1:
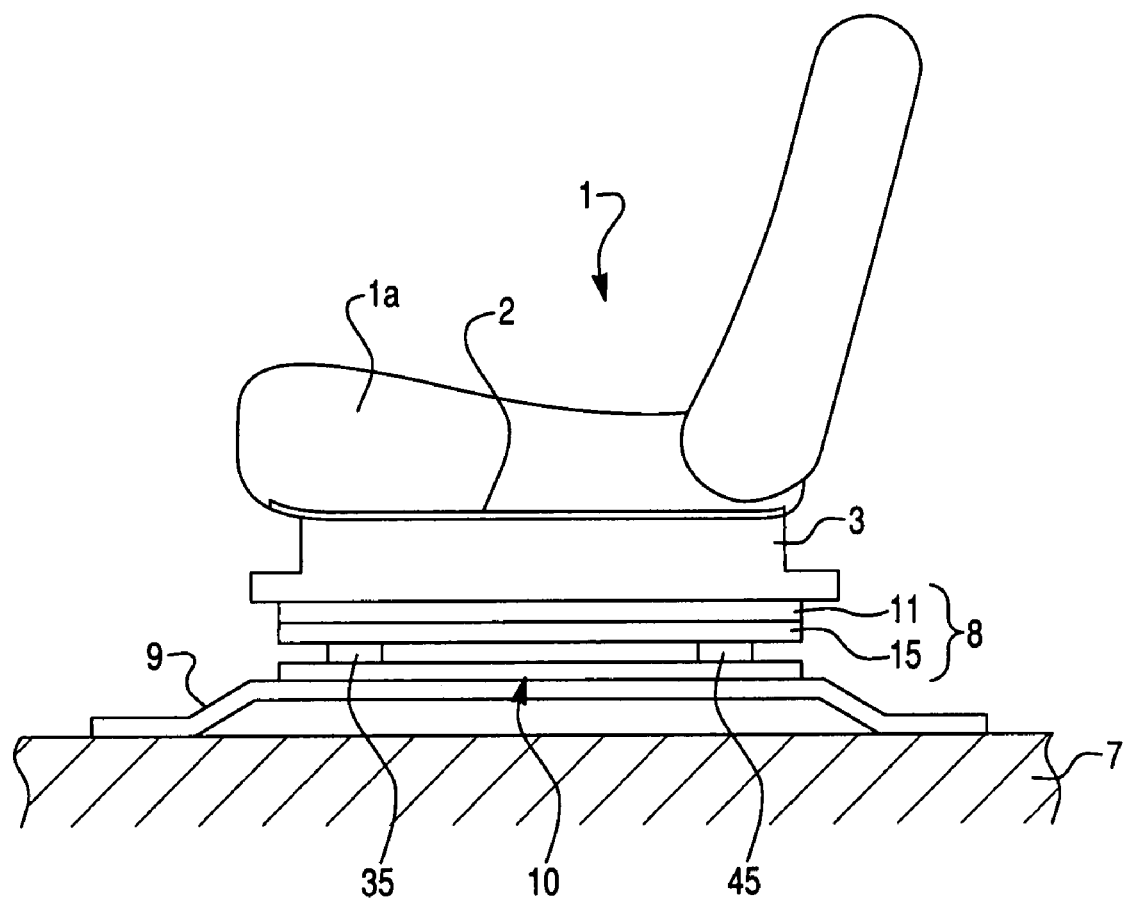
FIG. 1 is a side view schematically showing a vehicle seat provided with a seat load measuring apparatus according to one embodiment of the present invention.

As shown in FIG. 1, a vehicle seat 1 has a seat cushion 1a on which an occupant sits, and a seat pan 2 made of a steel plate which is disposed beneath the seat cushion 1a to entirely cover the under surface of the seat cushion 1a. Under the seat pan 2, a pair of side frames 3 (only one of which is shown in FIG. 1) extend downwardly from the seat pan 2 and are spaced apart from each other at a predetermined distance in the lateral (left-to-right) direction of the vehicle. Each side frame 3 is disposed to extend in the longitudinal (front-to-rear) direction of the vehicle. Disposed on the lower ends of the side frames 3 are seat rails 8 (only one of which is shown in FIG. 1), respectively. Each seat rail 8 is a combination of an upper rail 11 which is fixed to the lower end of the side frame 3 and a lower rail 15 which is arranged to slide relative to the upper rail 11 in the longitudinal direction of the vehicle.

Disposed on the under surfaces of the lower rails 15 are seat load measuring apparatuses 10 (only one of which is shown in FIG. 1). Each seat load measuring apparatus is connected to each lower rail 15 via a pair of front and rear rail brackets 35, 45. The seat load measuring apparatuses 10 are fixed to a pair of seat brackets 9 (only one of which is shown in FIG. 1) which are secured to a vehicle floor 7 and spaced apart from each other in the lateral direction of the vehicle.

Figure 2:
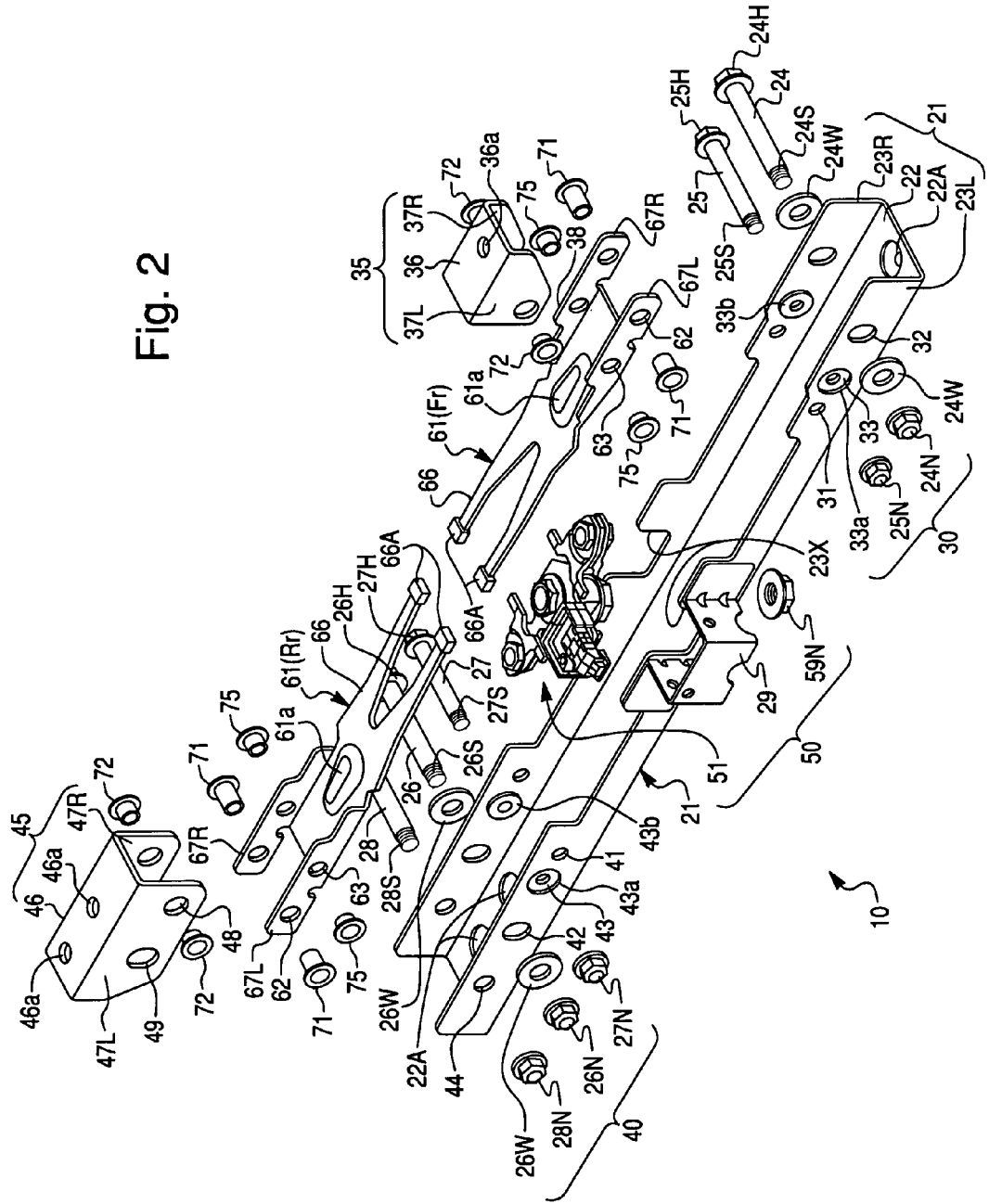
FIG. 2 is an exploded perspective view showing the seat load measuring apparatus according to one embodiment of the present invention.

As shown in FIG. 2 and FIGS. 3(A), 3(B), the seat load measuring apparatus 10 comprises a base frame 21 which extends in the longitudinal direction of the vehicle. The base frame 21 is composed of a base bottom 22 and base side walls 23L, 23R such that the base frame 21 is formed to have an upward U-shaped cross section (to have an open top). It should be noted that the base frame 21 may be formed to have a downward U-shaped cross section (to have an open bottom). The base frame 21 is provided near the front and rear ends thereof with mounting portions 30 and 40 relative to the vehicle body or the seat rails, respectively, and is provided at the center thereof with a sensor portion 50.

Figure 9A:
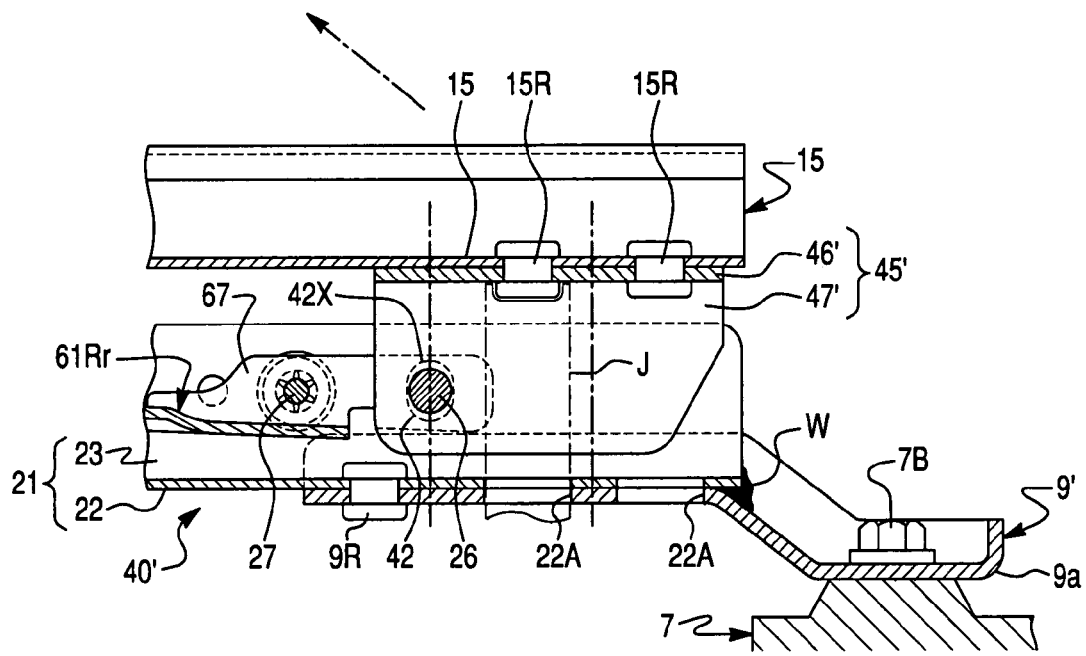

The mounting portion 30 at the front end side of the base frame 21 is provided with a hole 22A (see FIG. 2) which is formed in the base bottom 22 at a predetermined location and is provided with elongated holes 32, pivot holes 33, and small apertures 31 which are formed in front end portions of the left and right base side walls 23L, 23R, respectively to correspond to those of the other base side wall 23L, 23R. In FIG. 9(A) as will be described later, the hole 22A is a hole for insertion of a riveting jig J. The elongate holes 32 are long in the vertical direction. As shown in FIG. 2, FIGS. 3(A), 3(B), and FIG. 7(A), a stopper bolt (pivot pin) 24 is inserted through the elongated holes 32. The stopper bolt 24 is a pivot pin which pivotally supports a rail bracket 35 and a Z arm 61Fr together and transmits a seat load to the Z arm 61Fr as shown in FIG. 3(B). The stopper bolt 24 is provided at one end with a hexagon head 24H, at the other end with a threaded portion 24S, and at the middle with a smooth cylindrical surface. The stopper bolt 24 is inserted through the elongated holes 32 and is then fixed by a stopper nut 24N via a stopper washer 24W.

Figure 7A:
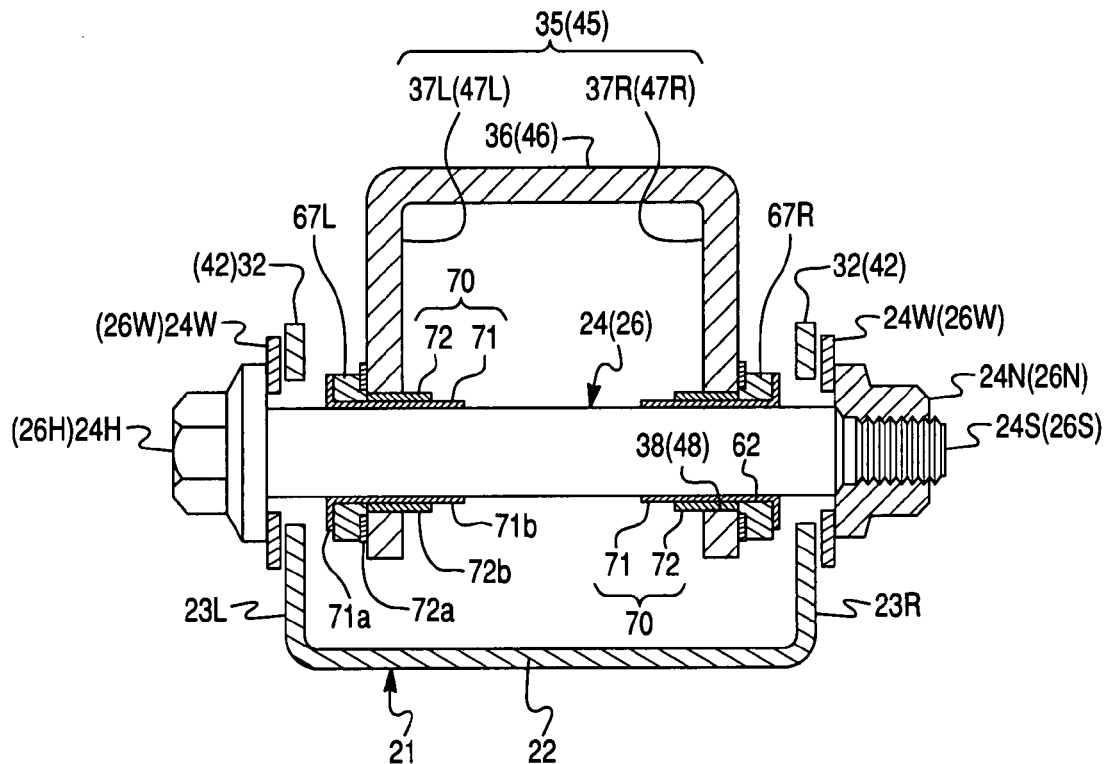

As shown in FIG. 7(A), there is a gap between the stopper bolt 24 and each elongate hole 32 in the assembled state so that the stopper bolt 24 is normally prevented from touching the inner peripheries of the elongated holes 32. However, when an excessive load is applied to the vehicle seat 1, the stopper bolt 24 is lowered to come in contact with the lower peripheries of the elongate holes 32 so that the excessive load is transmitted directly to the base side walls 23L, 23R of the base frame 21 from the rail bracket 35. In this case, the excessive load is not transmitted to a load sensor (sensor plate 52, as will be described later) 51. Also, when the rail bracket 35 is lifted up because of some effect of forces applied to the seat, the stopper bolt is lifted up to come in contact with the upper peripheries of the elongated holes 32 so as to exhibit the same works.

As shown in FIG. 2, the pivot holes 33 are formed in positions closer to the center than the positions of the elongated holes 32. Formed around the pivot holes 33 are counter bores 33a formed in outer surfaces of the base side walls 23L, 23R and convexities 33b formed in the inner surfaces of the base side walls 23L, 23R. Inserted into the pivot holes 33 is a pivot bolt (pivot pin) 25 as shown in FIG. 2, FIGS. 3(a), 3(B), and FIG. 7(B). The pivot bolt 25 is a pivot pin for supporting the Z arm 61Fr such that the Z arm 61Fr pivots relative to the base frame 21. When the seat load is applied to the Z arm 61Fr as shown in FIG. 3(B), the Z arm 61Fr pivots about the pivot bolt 25. The pivot bolt 25 is provided at one end with a hexagon head 25H, at the other end with a threaded portion 25S, and at the middle with a smooth cylindrical surface. The pivot bolt 25 is inserted through the pivot holes 33 and is then fixed by a pivot nut 25N.

Since the stopper bolt 24 and the pivot bolt 25 are of type to be fastened by the nuts 24N and 25N, these are easily and securely attached. The small apertures 31 formed adjacent to the pivot holes 33 are service windows for observation of the assembling state.

As shown in FIG. 2 and FIGS. 3(A), 3(B), the Z arm 61Fr is arranged inside the base frame 21 at the mounting portion 30 at the front end side of the base frame 21. The Z arm 61Fr has a portion on the rear side from the middle portion, which is forked into two plate-shape branches 66, when seen in plain view. The Z arm 61Fr has a portion on the front side, where arm side plates 67L, 67R are formed to stand upwardly from the left and right edges. As shown in FIGS. 3(A), 3(B) and FIGS. 7(A), 7(B), the Z arm 61Fr is assembled between the base side walls 23L and 23R to extend along the inner surfaces of the base side walls 23L and 23R. There are gaps between the arm side plate 67L and the base side wall 23L and between the arm side plate 67R and the base side wall 23R so that flanges of sleeves 70 (71, 72) and 75 are disposed in these gaps As shown in FIG. 2, each of the side plates 67L, 67R of the Z arm 61Fr is provided with holes 62, 63 formed at locations corresponding to the elongate hole 32 and the pivot hole 33 of the base side wall 23L, 23R. As shown in FIG. 2, FIGS. 3(A), 3(B), FIGS. 7(A), 7(B), inserted into the holes 62 (corresponding to the elongate holes 32 of the base frame 21) formed near the front end of the Z arm 61Fr is the stopper bolt 24. Inserted into the holes 63 (corresponding to the pivot holes 33 of the base frame 21) at the middle portion side of the Z arm 61Fr is the pivot bolt 25.

The main task of the stopper bolt 24 is connecting the rail bracket 35 and the Z arm 61Fr in such a manner as to allow the pivotal movement of them and transmitting a seat load to the Z arm 61Fr as can be seen in FIG. 3(B). Since there are gaps between the stopper bolt 24 and the elongated holes 32, the base frame 21 and the stopper bolt 24 are normally prevented from interfering each other. On the other hand, the main task of the pivot bolt 25 is pivotally supporting the Z arm 61Fr relative to the base frame 21, whereby the Z arm 61 can pivot about the pivot bolt 25.

The branches 66 of the Z arm 61Fr are designed to have a smaller distance between them at the middle portion side. As shown in FIG. 2 and FIGS. 3(A), 3(B), a ridge portion 61a is formed in the middle portion of the Z arm 61Fr, thereby increasing the strength of the Z arm 61Fr. Action portions at the ends (rear ends) of the branches 66 are covered by resin arm caps 66A, respectively. The resin arm caps 66A are sandwiched between wings 53a, 55a of upper and lower half arms 53, 55 (see FIG. 5(B)) of the load sensor 51 (as will be described later). Because of the arm caps 66A, noises (contact noise between metals) generated when the action end portions of the Z arm 61Fr collide with the wings 53a, 55a of the half arms 53, 55 can be nearly completely absorbed, thereby preventing the occupants sitting on the vehicle seat 1 from hearing jarring sounds. As a load is exerted on the rail bracket 35, the Z arm 61Fr slightly pivots, whereby the action end portions transmit the load to the sensor plate 52 (corresponding to the distortion member of the present invention) through the half arms 53, 55.

At the mounting portion 30 at the front end side, the front rail bracket 35 is assembled inside the Z arm 61Fr. As shown in FIG. 2, FIGS. 3(A), 3(B), and FIG. 7(A), the front rail bracket 35 is composed of a flat top portion 36 and side walls 37L, 37R extending downwardly from the left and right edges of the top portion 36 in such a manner as to have an inverted U-shaped cross section. The lower rail 15 of the seat rail 8 is mounted on the upper surface of the top portion 36. In this case, the top portion 36 has a hole 36a formed therein through which a rivet fastening the top portion 36 and the seat rail 8 together is inserted.

Each of the left and right side plates 37L, 37R of the front rail bracket 35 is substantially formed in a trapezoidal shape. The left and right side plates 37L, 37R have holes 38, respectively, to face each other. The holes 38 are formed at locations corresponding to the elongate holes 32 of the base side walls 23L, 23R and the holes 62 of the Z arm 61Fr. In the assembled state, inserted into the holes 38 is the stopper bolt 24 as shown in FIGS. 3(A), 3(B), and FIG. 7(A).

Figure 8:
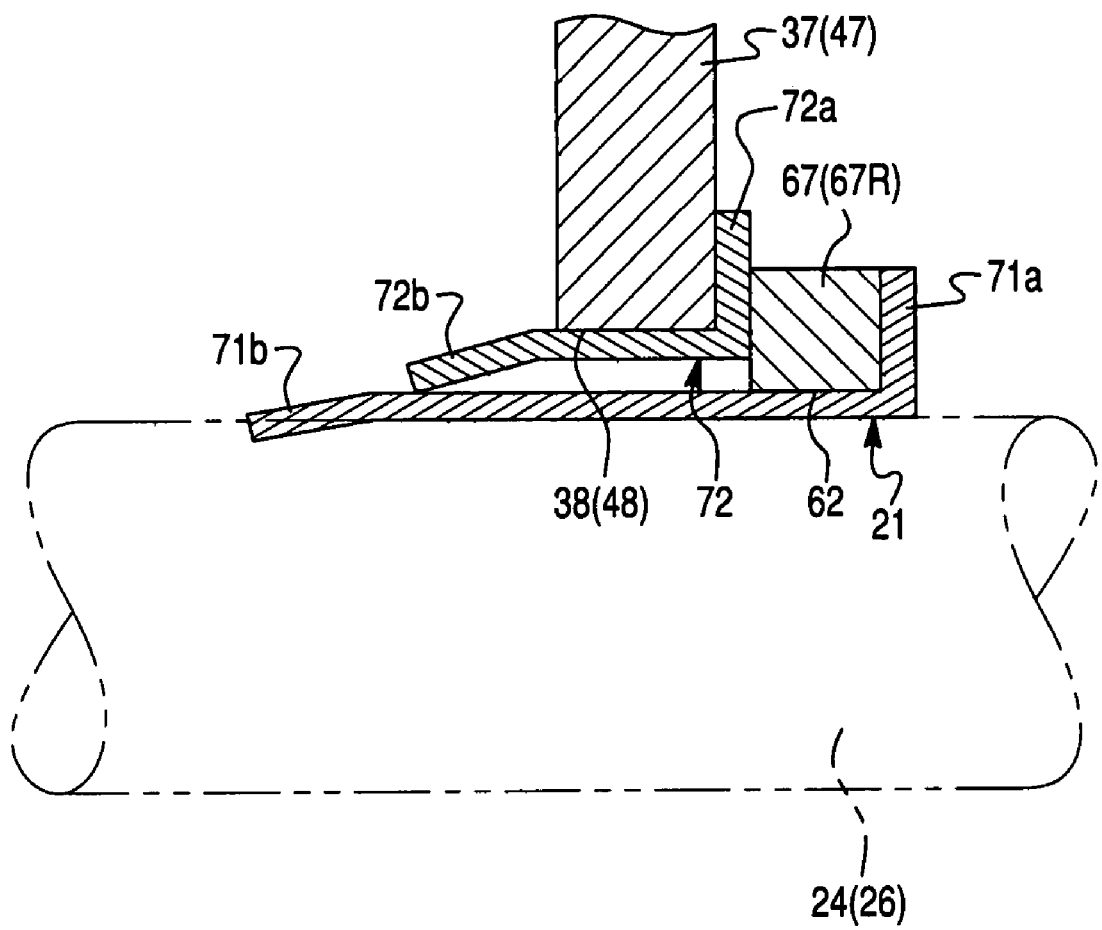
FIG. 8 is an enlarged sectional view showing a portion near a double sleeve of the seat load measuring apparatus of one embodiment of the present invention.

As shown in FIG. 7(A) and FIG. 8, double sleeves 70 are fitted around the outer periphery of the cylindrical portion of the stopper bolt 24. Each of the double sleeve 70 comprises an inner sleeve 71 which is longer and an outer sleeve 72 which is shorter and fitted around the inner sleeve 71. The sleeves 71, 72 have flanges 71a, 72a at one ends and tapered portions 71b, 72b (see FIG. 8) at the other ends. The inner surfaces of the sleeves 71, 72 and the end faces of the flanges 71a, 72a are coated with Teflon®. It should be noted that FIG. 8 shows the inclinations of the tapered portions 71b, 72b in an exaggerated way.

The inner sleeve 71 of the double sleeve 70 is fitted into a space between the shaft portion of the stopper bolt 24 and the hole 62 of the arm side plate 67L (67R) and a space between the shaft portion of the stopper bolt 24 and the hole 38 of the front rail bracket 35. The outer sleeve 72 is press fitted between the outer periphery of the inner sleeve 71 and the hole 38 of the front rail bracket 35. The flange 72a of the outer sleeve 72 is disposed between the arm side plate 67L (67R) and the side plate 37L (37R) of the front rail bracket 35. The flange 71a of the inner sleeve 71 abuts on the outer surface of the arm side plate 67L (67R).

Now, the relation between the double sleeve 70 and the peripheral components and the works of the double sleeve 70 will be explained with reference to FIG. 8. Since the inner sleeve 71 is press fitted into the hole 62 of the arm side plate 67L (67R), the inner sleeve 71 is prevented from rattling within the hole 62. Between the inner sleeve 71 and the stopper bolt 24 inserted through the inner bore of the inner sleeve 71, the tapered portion 71b of the inner sleeve 71 is elastically in contact with and supports the outer periphery of the stopper bolt 24. Therefore, while there is a clearance between a portion of the inner sleeve 71 other than the tapered portion 71b and the stopper bolt 24, the stopper bolt 24 is prevented from rattling within the inner bore of the inner sleeve 71.

Between the outer sleeve 72 and the inner sleeve 71 fitted in the inner bore of the outer sleeve 72, the tapered portion 72b of the outer sleeve 72 is elastically in contact with and supports the outer periphery of the inner sleeve 71. Therefore, while there is a clearance between a portion of the outer sleeve 72 other than the tapered portion 72b and the inner sleeve 72, the inner sleeve 71 is prevented from ratting within the inner bore of the outer sleeve 72.

Accordingly, there is no clearance allowing the ratting of the components between the side plate 37 of the front rail bracket 35 and the stopper bolt 24, thereby preventing the occurrence of noise (contact noise between metals) generated due to the rattling of these components when the weight applied to the seat is varied.

Figure 7B:
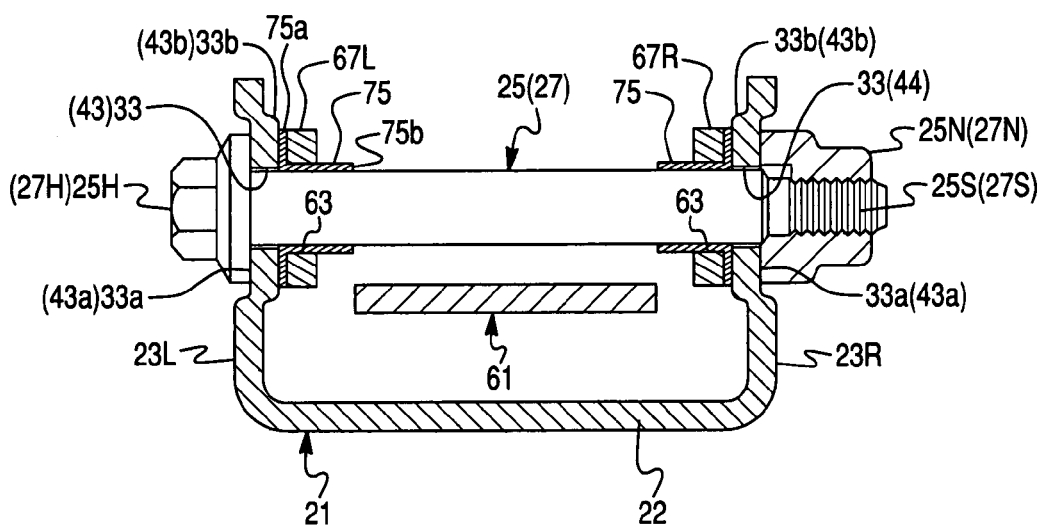

Now, description will be made as regard to the peripheral components of the pivot bolt 25 as the pivot for the Z arm 61Fr and the front rail bracket 35. As shown in FIG. 7(B), sleeves 75 are fitted around the outer periphery of the cylindrical portion of the pivot bolt 25. Each sleeve 75 has a flange 75a at its one end and a tapered portion 75b at its other end. The inner surface of the sleeve 75 and the end face of the flange 75a are coated with Teflon®.

Since the sleeve 75 is press fitted into the hole 63 of the arm side plate 67L (67R), the inner sleeve 75 is prevented from rattling within the hole 63. Between the sleeve 75 and the pivot bolt 25 fitted in the inner bore of the sleeve 75, the tapered portion 75b of the sleeve 75 is elastically in contact with and supports the outer periphery of the pivot bolt 25. Therefore, while there is a clearance between a portion of the sleeve 75 other than the tapered portion 75b and the pivot bolt 25, the stopper bolt 25 is prevented from rattling within the inner bore of the sleeve 75. Accordingly, the occurrence of noise generated due to the rattling of the pivot bolt 25 and/or the Z arm 61Fr when the load applied to the seat is varied can be prevented.

Next, the mounting portion 40 at the rear end side of the base frame 21 will be explained. The different point of the mounting portion 40 at the rear end side of the base frame from the aforementioned mounting portion 30 at the front end side of the base frame is that the mounting portion 40 at the rear end side of the base frame has two stopper bolts as the protective mechanism for transmitting excessive load from the rear rail bracket 45 to the base frame 21, thereby having higher loading capacity than the mounting portion 30 at the front end side of the base frame.

That is, the mounting portion 40 at the rear end side is provided with a front-side first stopper bolt 26 and a rear-side second stopper bolt 28. The front-side stopper bolt 26 (hereinafter, sometimes called as "front stopper bolt 26") has the same components as those of the stopper bolt 24 of the mounting portion 30 at the front side mentioned above so that the same appendices as those of the numeral "24" are added to the numeral "26" and detail descriptions of the components are omitted. The rear-side second stopper bolt 28 (hereinafter, sometimes called as "rear stopper bolt 28") is an additional reinforcing member which is not used in the mounting portion 30 at the front end side. The following description will center on the structure of the second stopper bolt 28 as an additional member and the related components.

Figure 6A:
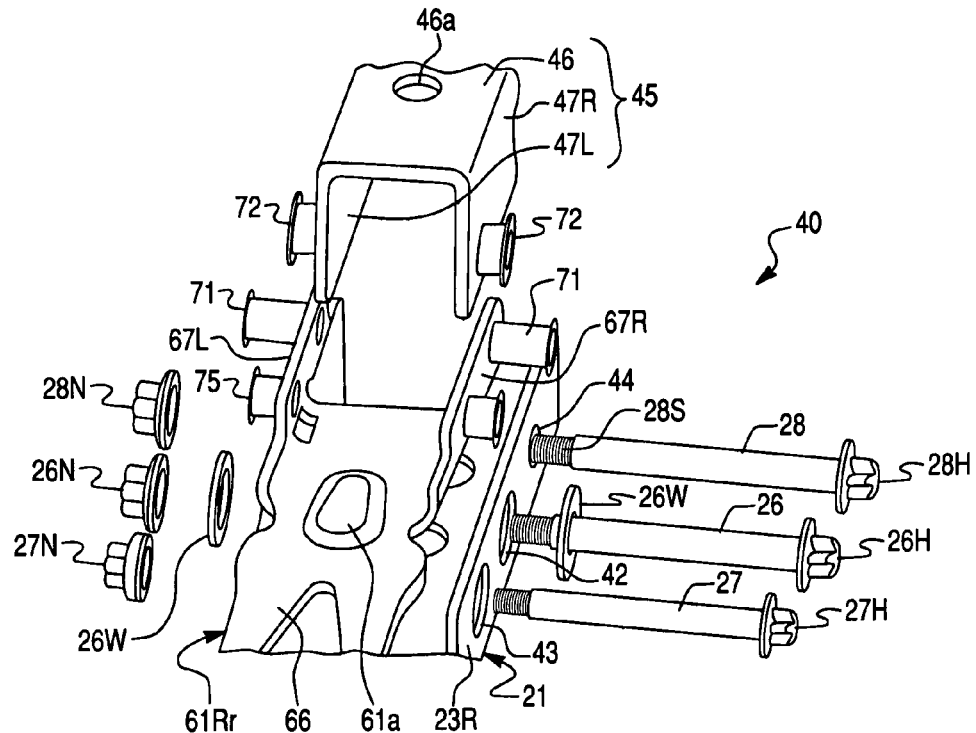
Figure 6B:
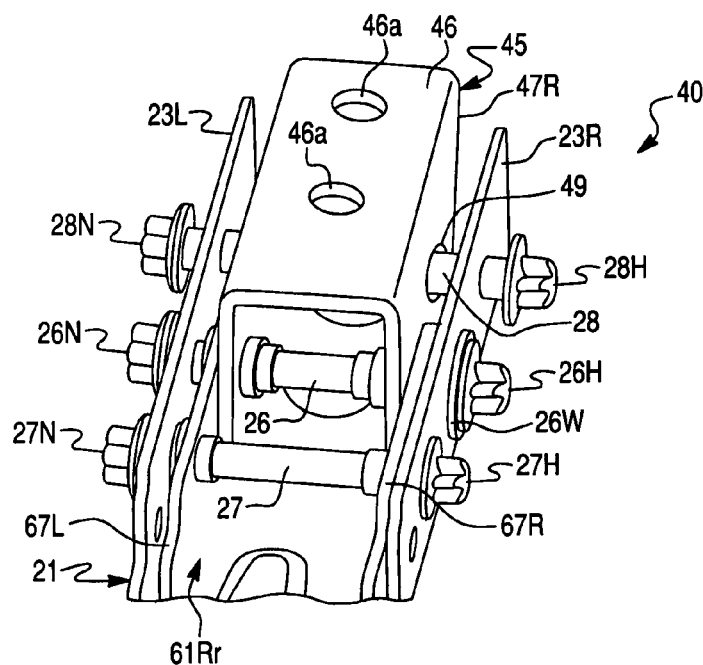
Figure 10A:
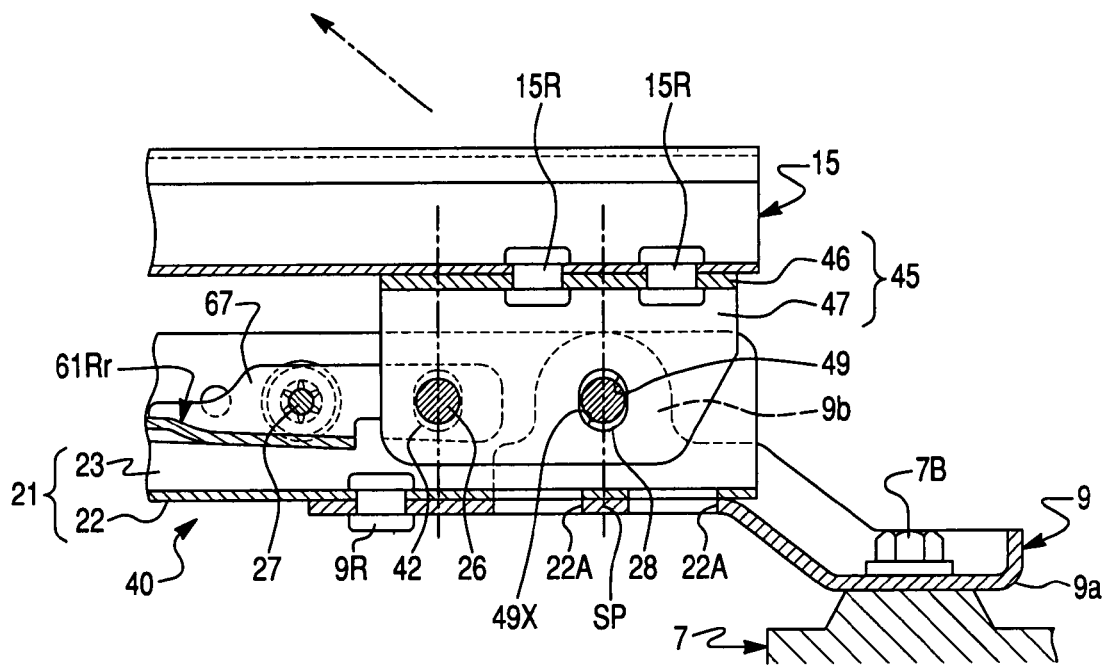
Figure 10B:
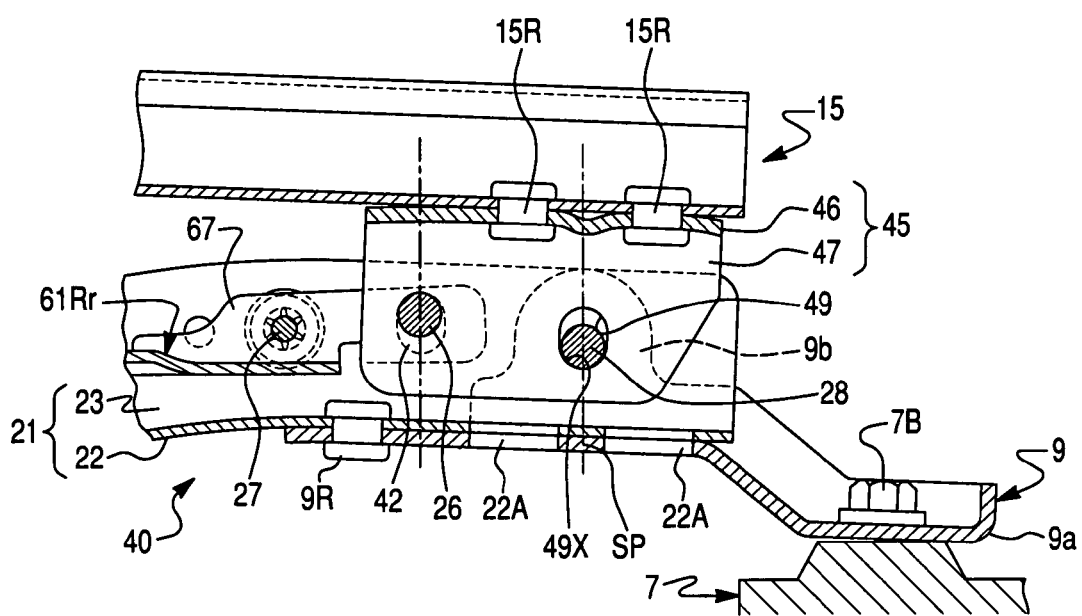

The base frame 21 has circular holes 44, adjacent to elongated holes 42 and nearer to the rear end thereof than the elongated holes 42, through which the rear stopper bolt 28 is inserted. Each circular hole 44 has such a diameter as to allow the insertion of the shaft portion of the rear stopper bolt 28. As shown in FIG. 2 and FIGS. 6(A), 6(B), the rear stopper bolt 28 is provided at one end with a hexagon head 28H, at the other end with a threaded portion 28S, and at the middle with a smooth cylindrical surface. The rear stopper bolt 28 is fixed by a stopper nut 28N as shown in FIG. 3(A) and FIG. 6(B) when assembled. In the assembled state, there are spaces between the hexagon head 28H of the rear stopper bolt 28 and an outer surface of the base side wall 23 and between a bearing surface of the stopper nut 28N and an outer surface of the base side wall 23. Connecting portions 9b of the seat bracket (seat legs) 9 as shown in FIGS. 10(A), 10(B) as will be described later are situated in these spaces.

A Z arm 61Rr to be arranged inside the rear side portion of the base frame 21 has the same structure as the aforementioned Z arm 61Fr arranged in the front side portion of the base frame and comprises branches 66, arm side plates 67L, 67R, and arm caps 66A of action portions at the ends thereof. As shown in FIG. 2 and FIGS. 3(A), 3(B), the Z arm 61Fr at the front end side of the base frame and the Z arm 61Rr at the rear end side of the base frame are arranged symmetrically about the center of the base.

The rear rail bracket 45 is arranged inside the Z arm 61Rr. As shown in FIG. 2 and FIGS. 6(A), 6(B), the rear rail bracket 45 is composed of a flat top portion 46 and side walls 47L, 47R extending downwardly from the left and right edges of the top portion 46 in such a manner as to have an inverted U-shaped cross section. The lower rail 15 of the seat rail 8 is mounted on the upper surface of the top portion 46. In this case, the top portion 46 has two hole 46a formed therein through which rivets 15R (see FIGS. 10(A), 10(B)) fastening the top portion 46 and the lower rail 15 together are inserted.

Each of the side plates 47L, 47R of the rear rail bracket 45 is substantially formed in a trapezoidal shape. Each of the left and right side plates 47L, 47R have holes 48 and elongate holes 49 at locations corresponding to the elongated holes 42 and the circular holes 44 of the base side walls 23L, 23R. As shown in FIG. 2, FIGS. 3(A), 3(B), and FIG. 7(A), the front stopper bolt 26 is inserted through the holes 48 (corresponding to the elongate holes 42 and the holes 62 of the Z arm 61Rr). As shown in FIG. 7(A) and FIG. 8, double sleeves 70 are inserted through spaces between the front stopper bolt 26 and the hole 48 of the rear rail bracket 45 and between the front stopper bolt 26 and the hole 62 of the Z arm 61Rr similarly to the aforementioned case. In this case, the front stopper bolt 26 is loosely fitted to the elongate holes 42 of the base frame 21.

The rear stopper bolt 28 is inserted through the elongate holes 49 (corresponding to the circular holes 44) of the rear rail bracket 45 with suitable predetermined gaps. The works of the mounting portion 40 at the rear end side of the base frame 21 will be described later.

Figure 11:
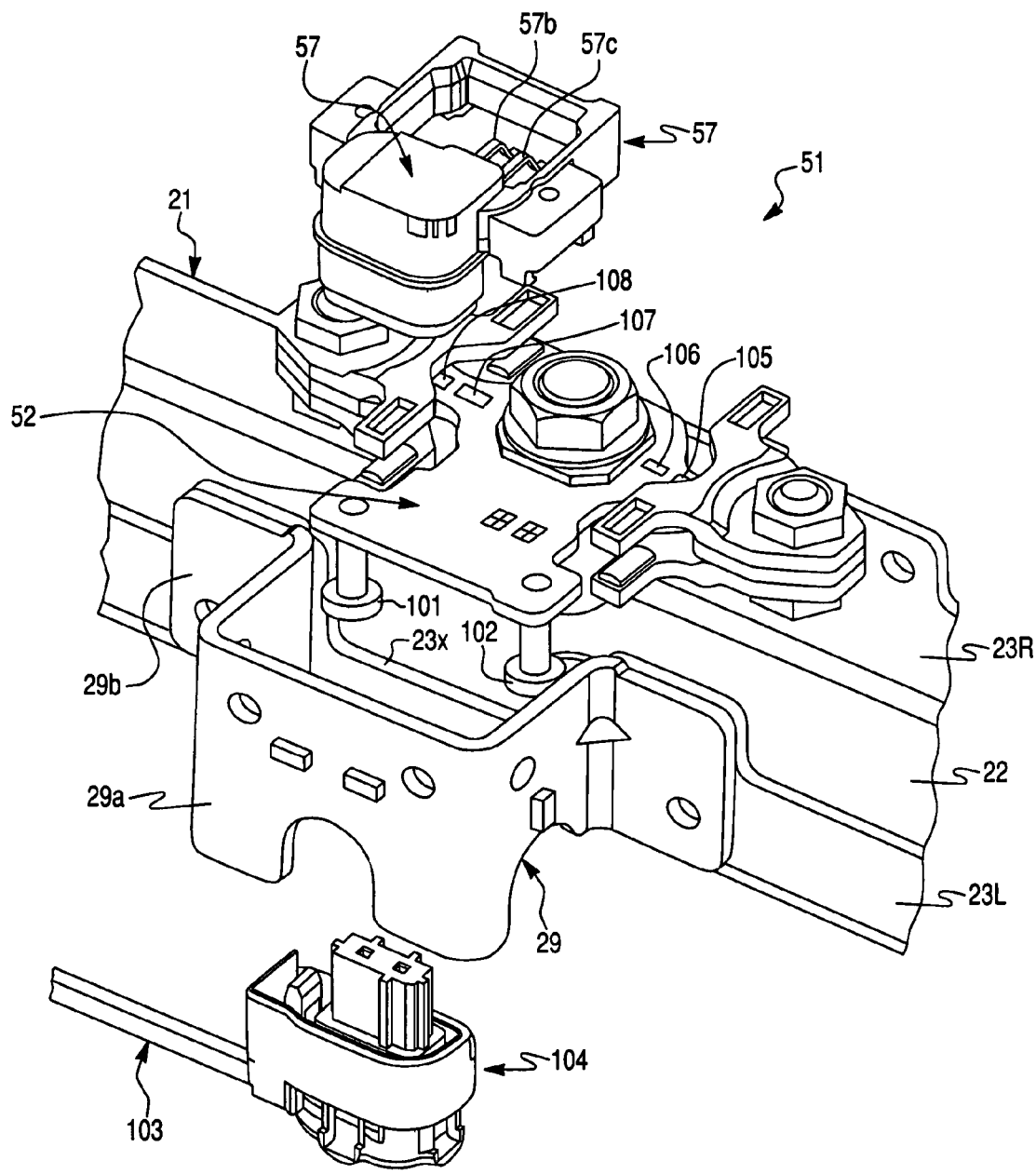
FIG. 11 is a partial enlarged perspective view of the sensor portion of the seat load measuring apparatus of one embodiment of the present invention shown in FIG. 2.

Hereinafter, the sensor portion 50 of the base frame 21 will be described. As shown in FIG. 2, each of the left and right base side walls 23L, 23R is formed with a notch 23X at the middle in the longitudinal direction of the base frame 21. A protector 29 which overhangs in the leftward direction is fixed to the outer surface of the left base side wall 23L. As shown in FIG. 11, the protector 29 is formed by bending a band-like plate to have a protecting portion 29a, formed in a U-like or C-like shape, and mounting flanges 29b, 29c formed on both sides of the protecting portion 29a. A load sensor 51 is installed inside the notches 23X of the base frame 21 and the protector 29.

Figure 12:
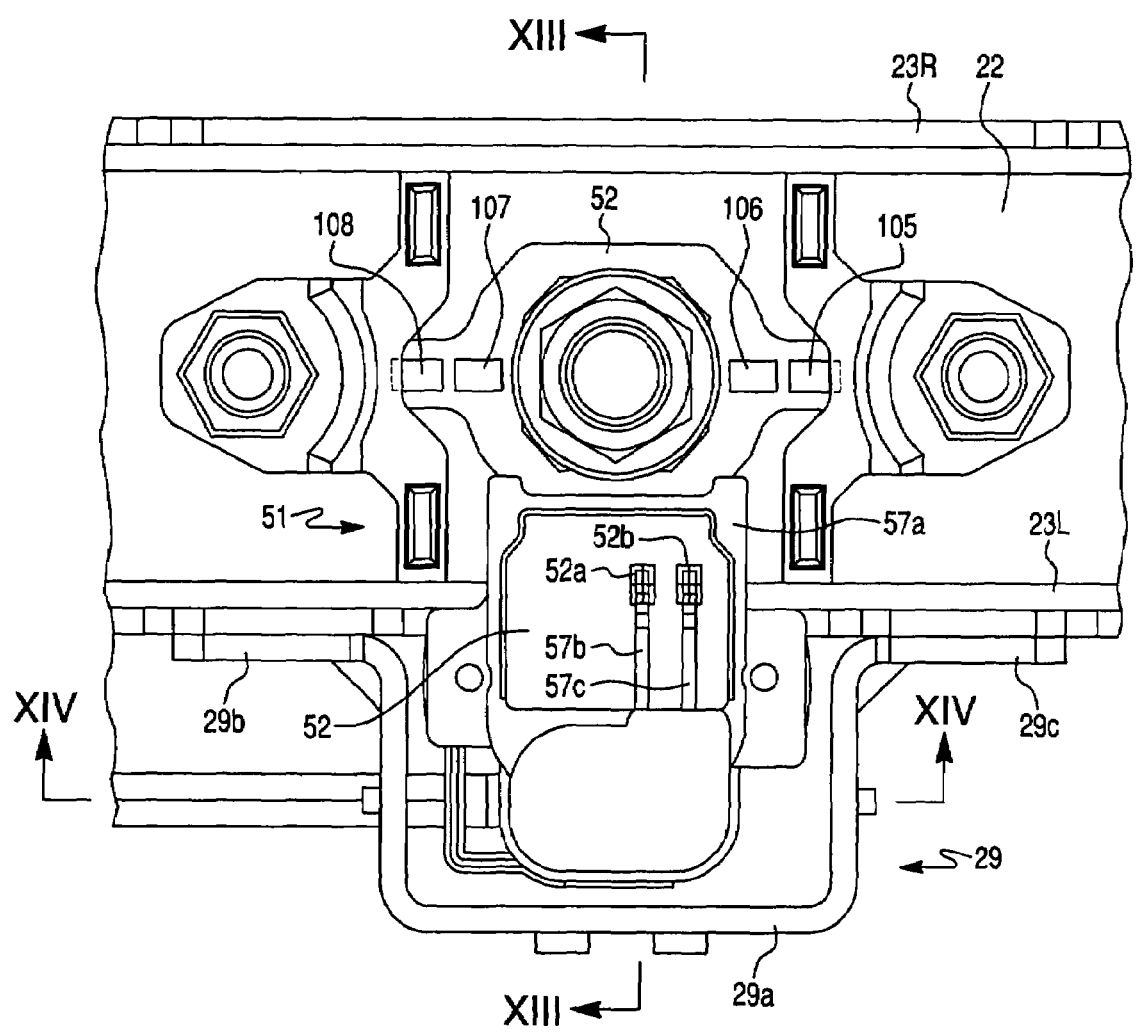
FIG. 12 is a partial plan view of the sensor portion of the seat load measuring apparatus of one embodiment of the present invention shown in FIG. 2.

That is, in a state that the mounting flanges 29b, 29c are attached to the base side wall 23L as shown in FIG. 12, the protecting portion 29a encloses and protects a portion of the load sensor 51 projecting outside of the base side wall 23L through the notch 23X of the base side wall 23L, i.e. a connector receiving portion (see FIG. 11) of the sensor plate 52 and a connector casing 57a (see FIG. 11 and FIG. 12) of a sensor-side connector 57. The connector casing 57a is attached to the upper surface of the connector receiving portion by casing fixing screws 101, 102 (see FIG. 11).

Figure 5A:
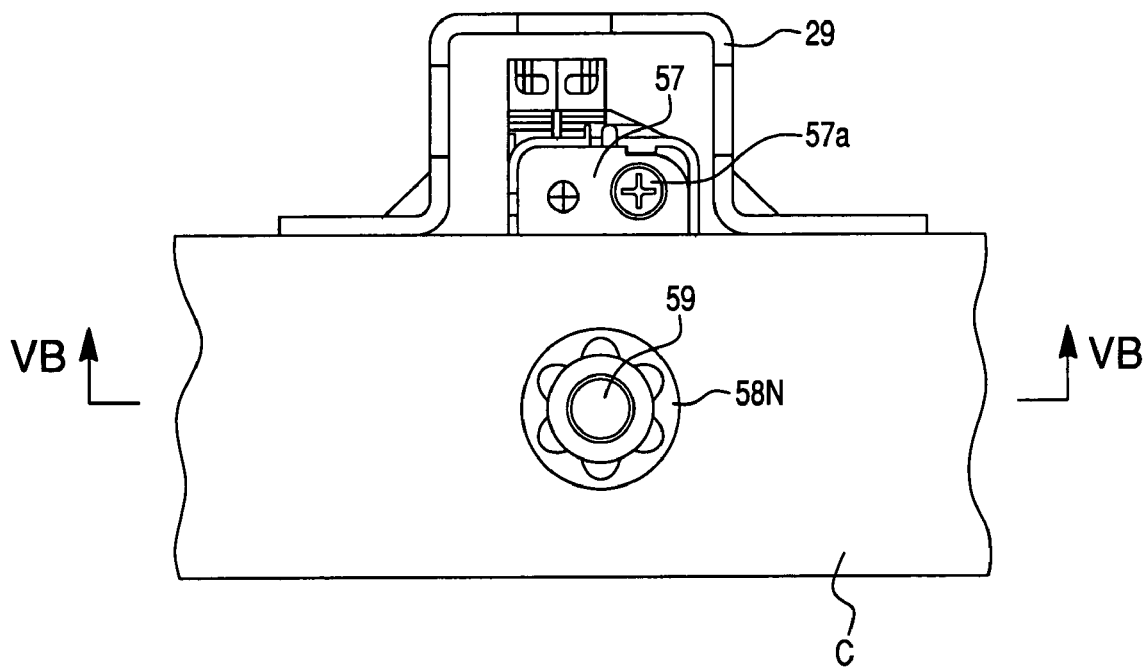
FIGS. 5(A), 5(B) are enlarged partial views of a portion about the sensor portion in the seat load measuring apparatus of one embodiment of the present invention.
Figure 5B:
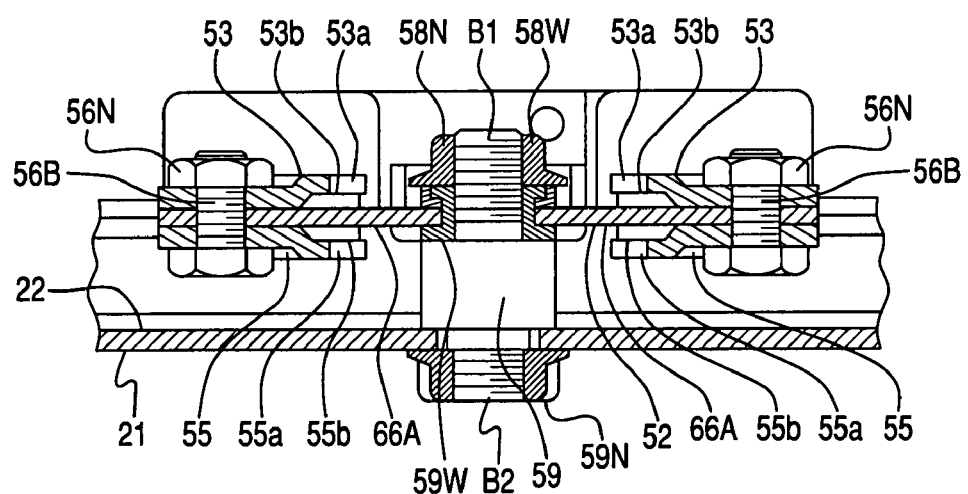

As shown in FIG. 5(B), in a state that the sensor plate 52, the connector casing 57a, and the protector 29 are assembled in the base frame 21, the level of the upper edge of the protector 29 is higher than any of the level of the upper surface of the sensor plate 52, the level of the upper surface of the connector casing 57a, and the level of the upper surface of the sensor-side connector 57. The level of the lower edge of the protector 29 is lower than any of the level of the lower surface of the sensor plate 52, the level of the lower surface of the connector casing 57a, and the level of the lower surface of the sensor-side connector 57. According to this design, the protector 29 can securely protect precision components such as the sensor plate 52 and the connector 57 of the seat load measuring apparatus 10 even if the base frame in which the seat load measuring apparatus 10 and the protector 29 are assembled is dropped when the base frame 21 is mounted to a vehicle or during transportation.

Since the upper side of the protector 29 is open, a cover (not shown) is preferably provided to cover the upper side of the protector 29 in order to further ensure the protection. The lower side of the protector 29 is also open. However, since the object matters are easily removed from the inside of the protector 29 even if object matters enter into the protector 29, there is no necessary to cover the lower side of the protector 29.

Figure 15:
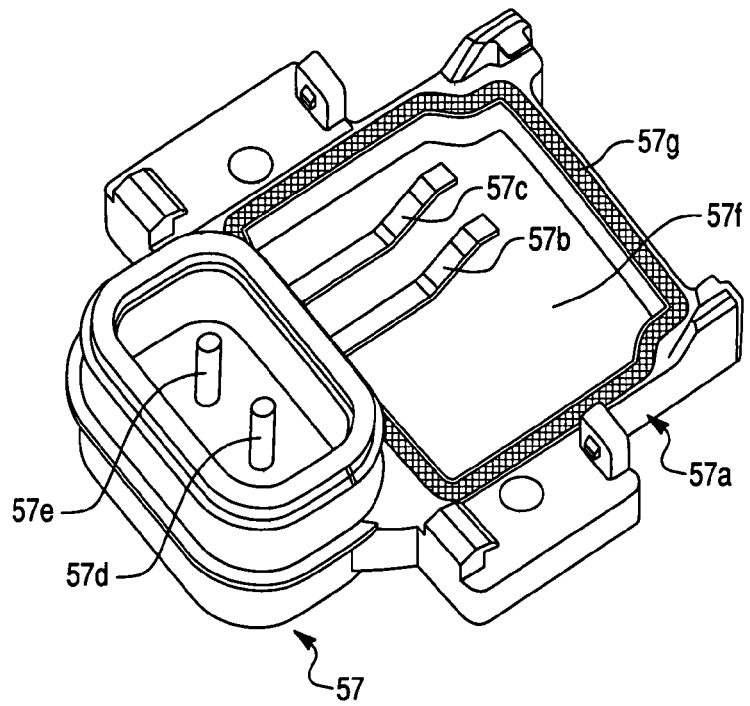
FIG. 15 is a perspective view partially showing a connector casing of one embodiment of the present invention.

As shown in FIG. 15, the connector casing 57a has an opening 57f. Disposed around the peripheral edge, on the side to be in contact with the sensor plate 52, of the opening 57f is a watertight packing 57g. With the watertight packing 57g, the connector casing 57a and the sensor plate 52 can be water-tightly sealed. When potting is made on the opening 57f, the watertight packing 57g also functions to prevent leakage of potting material. The opening 57f is covered by resin, on the side not the side to be in contact with the sensor plate 52, in order to prevent object matters from entering through the opening 57f.

Figure 13:
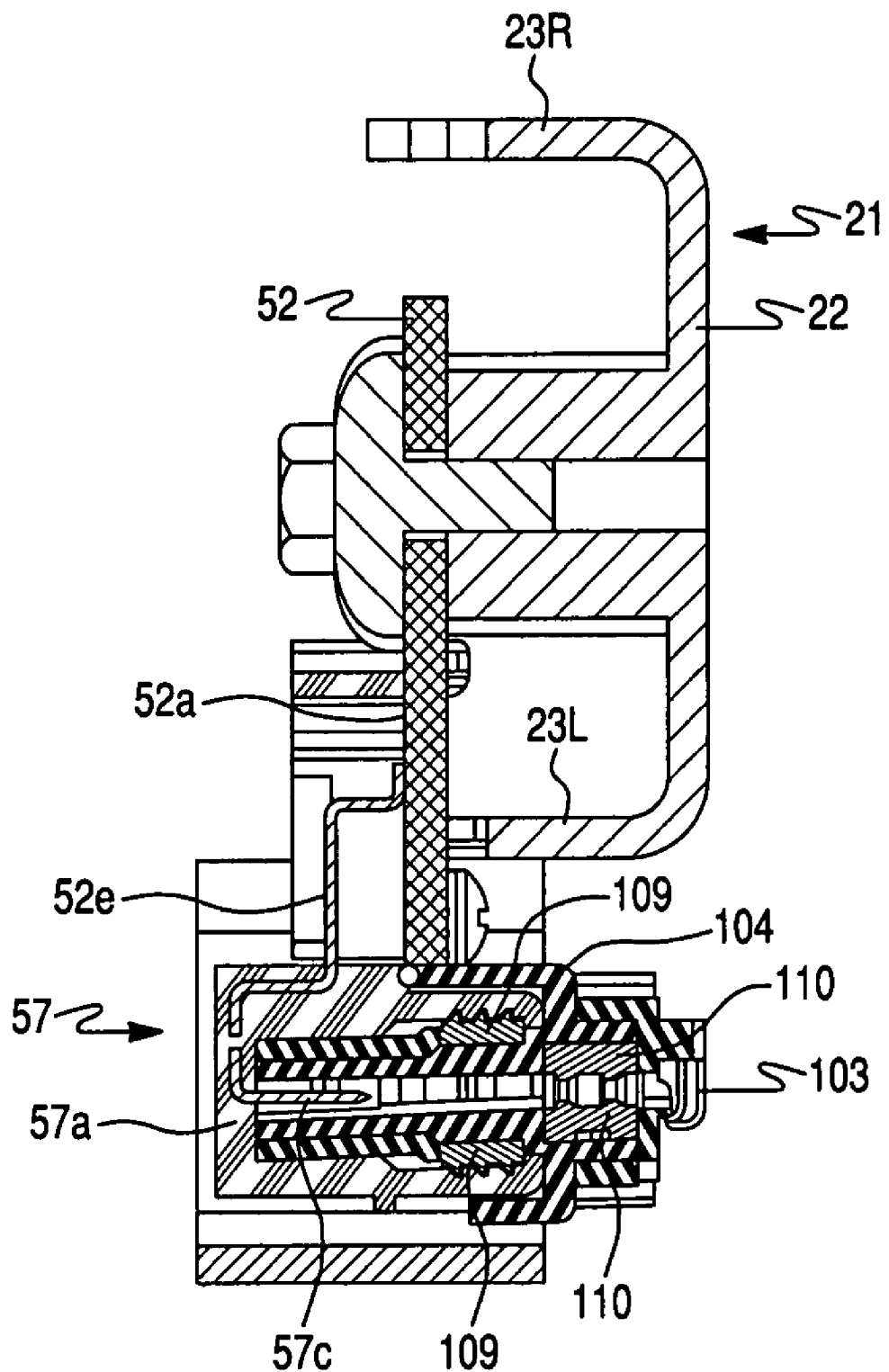
FIG. 13 is a sectional view taken along a line XIII-XIII of FIG. 12.
Figure 14:
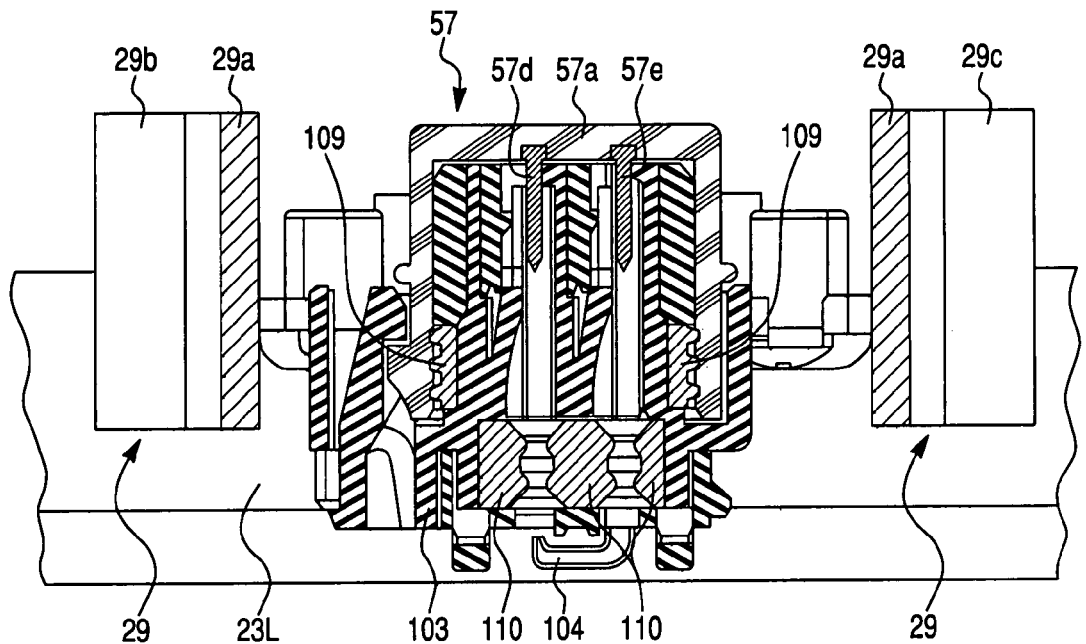
FIG. 14 is a sectional view taken along a line XIV-XIV of FIG. 12.

Since the upper side of the casing of the cable-side connector 104 is also open, watertight packings 109, 110 are provided to the casing of the cable-side connector 104 as shown in FIG. 13 and FIG. 14. By these watertight packings 109, 110, the upper side of the cable-side connector 104 is water-tightly sealed. FIG. 12 and FIG. 13 show an example of structure for mounting the sensor plate 52 to the base frame 21, this example being different from the mounting structure composed of the components shown in FIG. 4. That is, as shown in FIG. 13, the sensor plate 52 can be attached to the base frame 21 just by screwing bolts into a mounting base provided on the base bottom 22.

Figure 4:
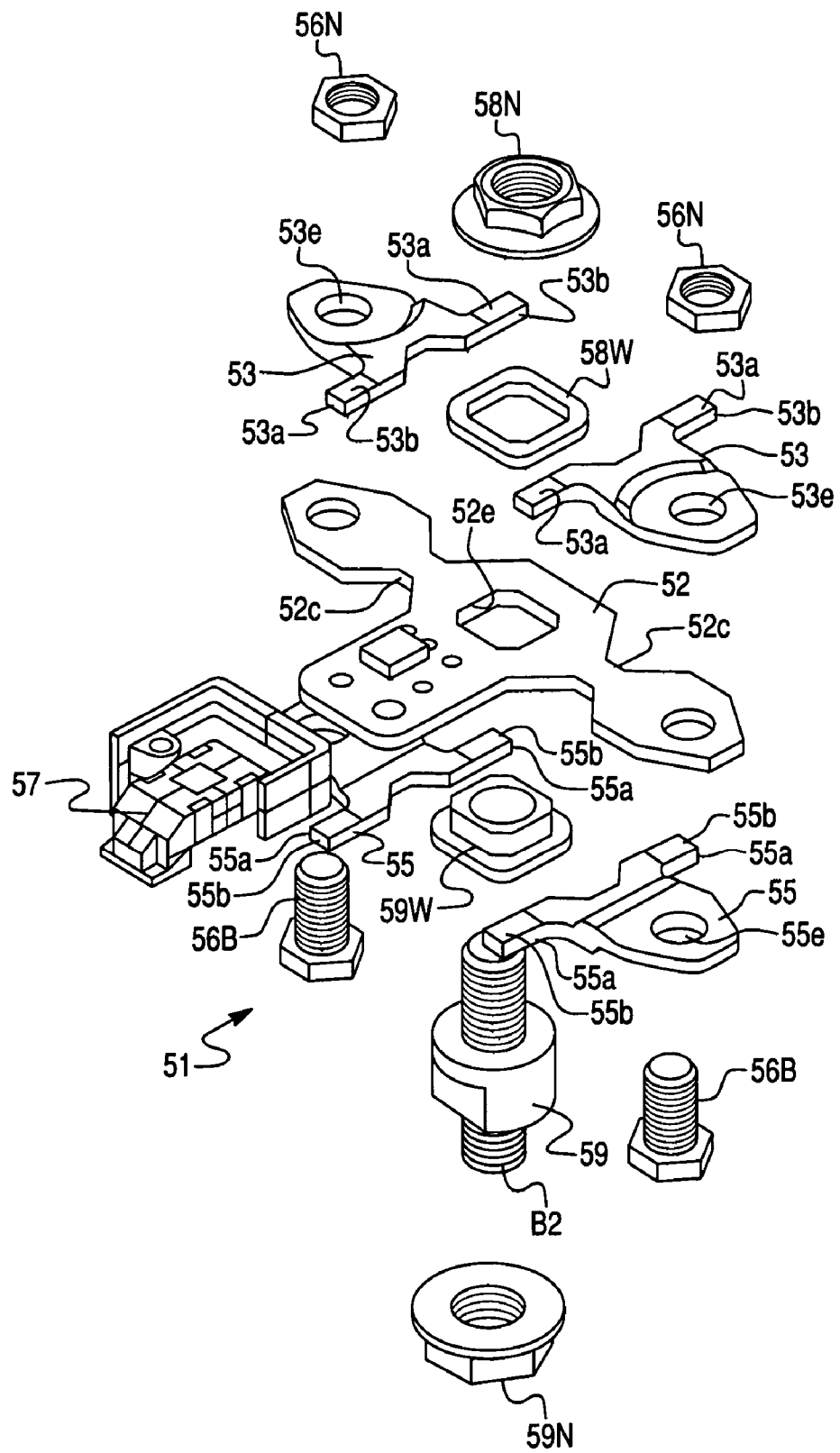
FIG. 4 is an exploded perspective view showing a sensor portion of the seat load measuring apparatus of one embodiment of the present invention.

As shown in FIG. 4, the sensor plate 52 as the main component of the load sensor 51 is a spring member which is a rectangular plate having two necks 52c as a whole. At the left end of the central portion of the sensor plate 52, the sensor-side connector 57 is fixed by a vise 57a (see FIG. 5(A)). Connected to the sensor-side connector 57 is an end of a cable connected to an electronic control unit (ECU: corresponding to the control device of the present invention) not shown.

On the sensor plate 52, an insulating layer for electrical insulating, a wiring layer, and a resistive layer are formed. On the sensor plate 52, as shown in FIG. 12, four strain resistors 105, 106, 107, 108 are formed as strain gauges which cooperate together to compose the load sensor 51. The four strain resistors 105, 106, 107, 108 are connected to each other to form a bridge circuit which is connected to the connector 57. In this case, as shown in FIG. 12 and FIG. 13, terminals 57b, 57c of the connector 57 are connected to the conductors 52a, 52b of the bridge circuit formed on the sensor plate 52 by the strain resistors.

As shown in FIG. 15, ends 57d, 57e, opposite to the side connected to the conductors 52a, 52b, of the terminals 57b, 57c of the connector 57 are disposed to project downwardly, thereby forming a male connector 57. The terminals 57b, 57c of the connector 57 are press-fitted into the connector casing 57a and are thus united with the connector casing 57a.

As shown in FIG. 13 and FIG. 14, the connector 57 is composed of a male connector 57 having terminals projecting downwardly. The entry of the male connector 57 faces the open bottom of the protector 29. On the other hand, as shown in FIG. 11, the cable 103 to be connected to the ECU is provided with the cable-side connector 104. The cable-side connector 104 is composed of a female connector 57 which is detachable relative to the male connector 57.

The cable 103 to be connected to the ECU is connected to the cable-side connector 104. Therefore, in a state that the seat load measuring apparatus 10 is attached to the base frame 21, the cable-side connector 104 is inserted into the male connector 57 through the open bottom of the protector 29, thereby establishing the electrical connection. On the other hand, the cable-side connector 104 inserted in the male connector 57 can be detached from the male connector 57. Contrary to the aforementioned case, the connector 57 of the connector casing 57a side may be composed of a female connector and the connector of the cable 103 side may be composed of a male connector.

Since the load sensor 51 and the cable 103 to be connected to the ECU are structured to be detachable from each other by using a male connector and a female connector, the adaptability of the load sensor 51 and the connector casing 57a relative to various kinds of motor vehicles is achieved. The only requirement is preparing the cable 103 having a length corresponding to the kind of vehicle. Therefore, the seat load measuring apparatus 10 can be easily and inexpensively adopted to various kinds of motor vehicles.

By utilizing the open bottom of the protector 29, the load sensor 51 can be effectively protected and the connection and disconnection between the ECU and the load sensor 51 can be facilitated. In addition, the seat load measuring apparatus 10 can be easily and inexpensively adopted to various kinds of motor vehicles. Moreover, it is not required to form hole(s) and groove(s) for insertion of the cable-side connector 104, thus further simplifying the manufacture and reducing the cost.

Though the connection of the cable-side connector 104 is achieved by utilizing the open bottom of the protector 29, the connection of the cable-side connector may be achieved by utilizing the open top of the protector 29. In this case, the entry of the sensor-side connector 57 is arranged to face upwardly. Instead of the protector 29 which is open in at least one side in the vertical direction of the vehicle, a protector 29 which is open in at least one side in the longitudinal direction of the vehicle or a protector 29 which is open in at least one side in the lateral direction of the vehicle may be employed. Further, a protector 29 which is open in at least one side in the diagonal direction from upper front to lower back or from lower front to upper back, a protector 29 which is open in at least one side in the diagonal direction from upper left to lower right or from lower left to upper right, or a protector 29 which is open in at least one side in the diagonal direction from forward left to backward right or from backward left to forward right may be employed. That is, the protector 29 of the present invention may be a protector which is open in at least one side in any of the vertical direction, the longitudinal direction, the lateral direction, the diagonal direction from upper front to lower back or from lower front to upper back, the diagonal direction from upper left to lower right or from lower left to upper right, and the diagonal direction from forward left to backward right or from backward left to forward right. However, it is preferable to utilize the open bottom of the protector 29 for connection of the cable-side connector 104, because of the aforementioned reason.

Of course, the male connector 57 and the cable-side connector 104 can be delivered in the connected state. In addition, since the male connector 57 and the cable-side connector 104 are allowed to be connected during the assembly of a vehicle body by a car manufacturer, the male connector 57 and the cable-side connector 104 can be delivered separately. Moreover, the flexibility during manufacturing process is improved. In this manner, a seat load measuring apparatus which can be effectively adapted for various kinds of motor vehicles and has improved compatibility and efficiency.

As a seat load is exerted on the sensor plate 52, distortion corresponding to the seat load is caused on the sensor plate 52 so that the resistance values of the four strain resistors 105, 106, 107, 108 vary. The variations in the strain resistance value are detected, outputting a detection signal. The detection signal is transmitted from the sensor-side connector 57 to the ECU through the cable 103 (see FIG. 11). The ECU calculates the distortion of the sensor plate 52, that is, the seat load on the basis of the detection signal transmitted from the strain resistors. It should be noted that, instead of the detection of distortion of the sensor plate 52 by the strain resistors, the load may be obtained by conversion from deflection of the sensor plate 52 detected by other elements such as electrical capacitance pressure sensors or Hall elements.

The structure of mounting the sensor plate 52 to the base bottom 22 will be described here. As can be seen clearly in FIG. 5(B), a standing center post 59 is fixed to the base bottom 22 at the middle in the longitudinal direction of the base bottom 22. The center post 59 is a substantially cylindrical member having bolts B1, B2 projecting upwardly and downwardly. The lower bolt B2 of the center post 59 penetrates the base bottom 22 and is screwed into a center nut 59N. The upper bolt B1 of the center post 59 penetrates a central hole 52e (see FIG. 4) of the sensor plate 52 and is fixed by the center nut 58N via a center washer 59W. The center of the sensor plate 52 is solidly fixed to the base bottom 22 of the base frame 21 through the center post 59.

The structure of the load sensor 51 will be further described. Attached to the both front and rear ends of the sensor plate 52 are half arms 53, 55. The half arms 53, 55 are two pairs to be arranged at front and rear ends of the sensor plate 52, respectively. As for each pair, the half arms 53, 55 are arranged above and below the sensor plate 52 to clamp the sensor plate 52 as shown in FIG. 4 and FIG. 5(B). Since the half arms 53, 55 have same configuration, a description will be made as only the half arm 55 arranged below the sensor plate 52.

As shown in FIG. 4, the half arm 55 is a plate member of a rectangular shape and is provided with a mounting hole 55e formed in the center of the base thereof. The half arm 55 has wings 55a which project in the rightward and leftward directions from edges thereof near the center. Levee-like supports 55b are formed on the backs of the wings 55a to extend in the rightward and leftward directions. The top of each support 55b is slightly edged.

Hereinafter, a description will be made as regard to the assembly structure of the upper and lower half arms 53, 55, the sensor plate 52, and the action portions (arm caps 66A) of the Z arm 61. As can be seen most clearly in FIG. 5(B), the bases of the upper half arm 53 and the lower half arm 55 fully abut on the surfaces of the sensor plate 52 and are fixed by bolts 56B and nuts 56N. The wings 53 a, 55a of the upper and lower half arms 53, 55 are arranged in such a manner that the supports 53b, 55b confront each other. Sandwiched between the supports 53b, 55b are the arm caps 66A of the Z arm action portions. The supports 53b, 55b are positioned at the necks 52c of the sensor plate 52.

The actions of the upper and lower half arms 53, 55, the sensor plate 52, and the Z arm 61 when load is applied to the seat load measuring apparatus 10 are described in detail, for example, in Japanese Unexamined Patent Publication No. 2000-258223 and should be understood by reading the publication, so the description will be omitted here. The Load applied to the seat load measuring apparatus 10 is obtained by the computation of the ECU on the basis of the measured distortion of the sensor plate 52.

Figure 9B:
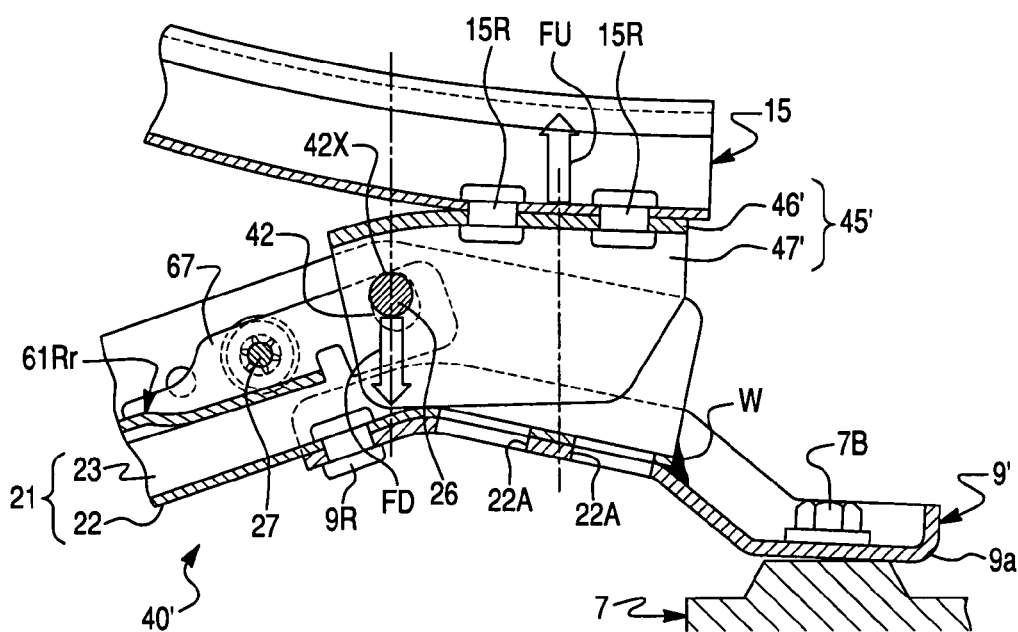

Hereinafter, description will be made as regard to the works of the mounting portion 40 at the rear end side of the seat load measuring apparatus 10 having the aforementioned structure. FIGS. 9(A), 9(B) show an example of a rear end portion of a base frame of a seat load measuring apparatus as a comparative example relative to the present invention, wherein FIG. 9(A) is a sectional view showing the normal state and FIG. 9(B) is a sectional view showing a state after a force in a direction of lifting the seat is exerted. FIGS. 10(A), 10(B) show the rear end portion of the base frame of the seat load measuring apparatus according to the embodiment of the present invention, wherein FIG. 10(A) is a sectional view showing the normal state and FIG. 10(B) is a sectional view showing a state after a force in a direction of lifting the seat is exerted.

As shown in FIGS. 9(A), 9(B), in a mounting portion 40' of the seat load measuring apparatus of the comparative example, only a single stopper bolt, i.e. the front stopper bolt 26, is provided for transmitting an excessive load exerted on a rear rail bracket 45' to a base frame 21. The stopper bolt 26 is perfectly fitted relative to the rear rail bracket 45' and a Z arm 61Rr and is loosely fitted in elongate holes 42 of the base frame 21. A lower surface of a lower rail 15 and a top portion 46' of the rear rail bracket 45' are connected to each other by two rivets 15R aligned in the longitudinal direction. On the other hand, a base bottom 22 of the base frame 21 is connected to a seat bracket (leg) 9' by a single rivet 9R at a front side (left side in FIGS. 9(A), 9(B)) and a welded portion W at a rear side. It should be noted that the welded portion W is more securely welded, for example by continuous welding, than spot welding of the present invention shown in FIG. 10 as described later.

The seat bracket 9' is fixed to a vehicle floor 7 by a bolt 7B. The vertical center line between the two upper rivets 15R and the vertical center line of the stopper bolt 26 are shifted from each other as shown in the drawings. The seat bracket 9' has two holes at locations corresponding to two holes 22A formed in the aforementioned base bottom 22. The holes 22A are provided for insertion of riveting jig J (shown by a virtual line in FIG. 9(A)). The riveting jig J is used for driving the rivets 15R for connecting the rail 15 and the rail bracket 45' after the seat load measuring apparatus and the seat rail 15 are put on the seat bracket 9'. Instead of the rivets 15R, bolts and nuts which can be inserted into the holes 22A may be used to connect the rail 15 and the rail bracket 45'.

In the mounting portion 40 of the seat load measuring apparatus 10 of the embodiment shown in FIGS. 10(A), 10(B), two stopper bolts, i.e. the front and rear stopper bolts 26, 28, are provided for transmitting an excessive load exerted on the rear rail bracket 45 to the base frame 21. The front stopper bolt 26 is perfectly fitted relative to the rear rail bracket 45 and the Z arm 61Rr and is loosely fitted in the elongate holes 42 of the base frame 21 (see FIG. 7(A)). On the other hand, the rear stopper bolt 28 is perfectly fitted relative to the base frame 21 and is loosely fitted in the elongated holes 49 of the rear rail bracket (see also FIG. 6(A)).

A lower surface of the lower rail 15 and the top portion 46 of the rear rail bracket 45 are connected to each other by two rivets 15R aligned in the longitudinal direction. The base bottom 22 of the base frame 21 is connected to the seat bracket 9 by a single rivet 9R at a front side (left side in FIGS. 10(A), 10(B)) and spot welding portions SP (at two locations aligned in the lateral direction of the vehicle) at the middle. The seat bracket 9 has two holes at locations corresponding to the holes 22A (see also FIG. 2) formed in the base bottom 22. Similarly to the above case, the holes 22A are provided for insertion of a riveting jig. While the vertical center line between the upper two rivets 15R and the vertical center line of the front stopper bolt 26 are shifted from each other, the vertical center line between the rivets 15R is substantially the same as the vertical center line of the rear stopper bolt 28. In this example, in the event of generation of an excessive load, the load applied to the seat rail 15 is transmitted directly to the seat bracket 9 via the rail bracket 45 and the rear stopper bolt 28. Therefore, relatively simple structure is enough for the connection between the base frame 21 of the seat load measuring apparatus 10 and the seat bracket 9.

The seat bracket 9 shown in FIGS. 10(A), 10(B) has a fixed base 9a and connecting portions 9b extending diagonally from the fixing base 9a. The fixed base 9a is fixed to a vehicle floor 7 by a bolt 7B. The connecting portions 9b stand along the respective base side walls 23L and 23R. The connecting portions 9b are disposed in spaces (see FIG. 2 and FIGS. 6(A), 6(B)) between the hexagonal head 28H of the rear stopper bolt 28 and the outer surface of the corresponding base side wall 23L, 23R and between the bearing surface of the stopper nut 28N and the outer surface of the corresponding base side wall 23L, 23R. The rear stopper bolt 28 penetrates the centers of the connecting portions 9b.

When large deceleration is applied to the vehicle body in the forward direction, for example, in the event of a vehicle collision, a moment inclining the occupant on the vehicle seat 1 toward the front acts on the vehicle seat 1 so that the rear side of the vehicle seat 1 is about to go up. As the vehicle seat 1 goes up, the rear end side of the lower rail 15 is lifted.

In the case of the mounting portion 40' of the comparative example, as the rear end side of the lower seat rail 15 is lifted and the rear rail bracket 45' is thus pulled up, the stopper bolt 26 fitted to the rear rail bracket 45' is also lifted as shown in FIG. 9(B). Then, the stopper bolt 26 is brought in contact with the upper edges 42X of the elongate holes 42 of the base side wall 23L, 23R. At this point, an upward force FU is exerted on the seat bracket 45' along the center line between the front and rear rivets 15R and a downward force FD is exerted on the seat bracket 45' along the vertical center line of the stopper bolt 26. Since the center lines are shifted from each other, great moment is applied to the seat bracket 45'. In this case, a significant large amount of the forces is exerted on the front rivet 15R. In addition, a pulling force acts on the upper edges 42X of the elongate holes 42 of the base frame 21 due to the moment. It is therefore preferable to reinforce the upper edges 42X of the elongate holes 42 of the base side walls 23L, 23R. It is also required that the rear end of the base bottom 22 is fixed to the seat bracket 9' by relatively strong welded portion W.

On the other hand, in the case of the mounting portion 40 of the embodiment shown in FIGS. 10(A), 10(B) according to the present invention, as the rear end side of the lower seat rail 15 is lifted and the rear rail bracket 45 is thus pulled up, the rear stopper bolt 28 loosely fitted to the rear rail bracket 45 is brought in contact with the lower edges 49X of the elongate holes 49 as shown in FIG. 10(B). As a result, the lifting of the rear rail bracket 45 is locked so that reduced load is applied to the front stopper bolt 26 fitted to the rear rail bracket 45. Therefore, the force lifting up the rear rail bracket 45 is transmitted directly to the connecting portions 9b of the seat bracket 9 which the rear stopper bolt 28 penetrates. Accordingly, the strength provided by the spot welding portions SP is enough for fixing the base frame 21 to the seat bracket 9 at the rear side.

As shown in FIG. 10(B), the moment of inclining the seat is applied evenly to the two rivets 15R connecting the lower rail 15 and the rear rail bracket 45 so as to reduce the local load on the lower rail 15 and the rear rail bracket 45, thereby preventing the lower rail 15 and the rear rail bracket 45 from being deformed. Since the vertical center line between the upper two rivets 15R is substantially the same as the vertical center line of the rear stopper bolt 28 as described above, the force of breaking the rivets 15R and the moment of bending the lower rail 15 are reduced. The moment of inclining the lower rail 15 is transmitted to the seat bracket 9 via the rear stopper bolt 28 and is finally received by the vehicle floor 7. The load to the base frame 21 is reduced so as to restrain the base frame 21 from being deformed. In this manner, effect of the rising of the seat rear portion upon the mounting portion 40 is avoided.

Figure 16A:
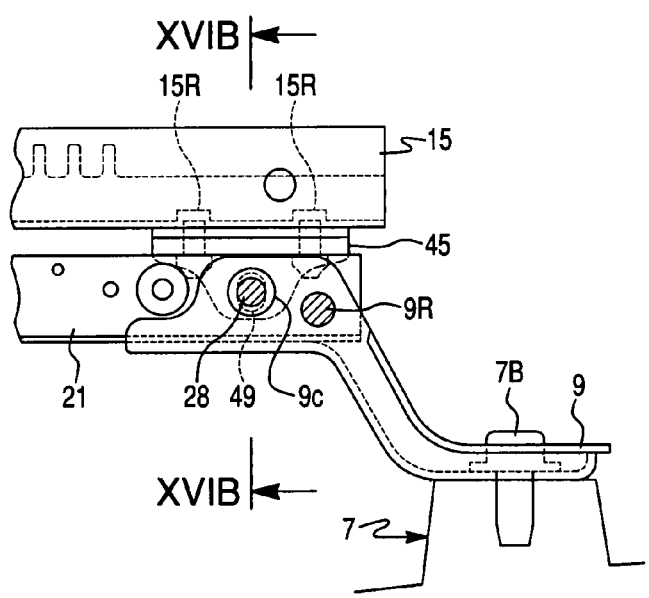
Figure 16B:
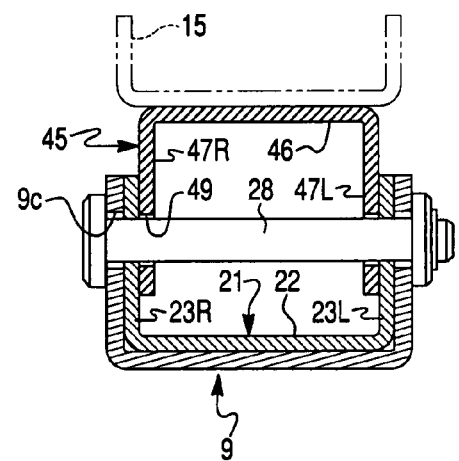
Figure 16C:
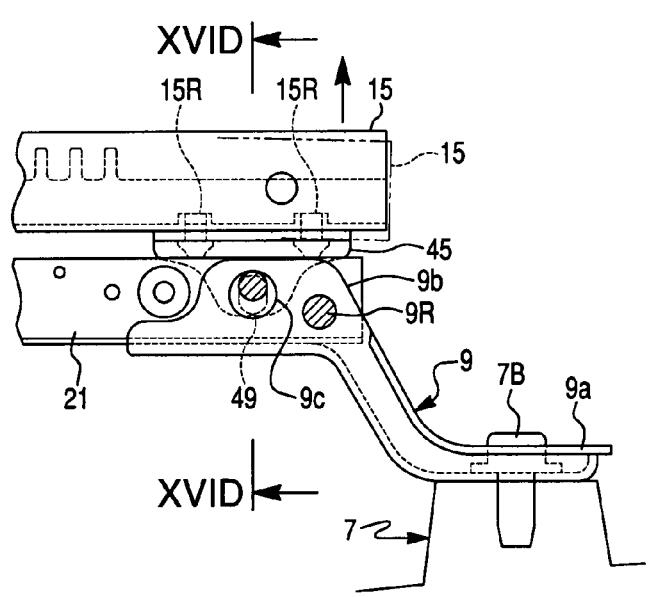
Figure 16D:
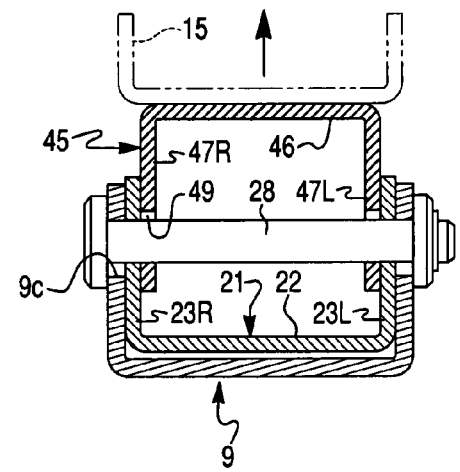

FIGS. 16(A)-16(D) show a variation example of the rear end portion of the base frame of the seat load measuring apparatus shown in FIGS. 10(A), 10(B), wherein FIG. 16(A) is a side sectional view showing the normal state, FIG. 16(B) is a sectional view taken along a line XVIB-XVIB of FIG. 16(A), FIG. 16(C) is a side sectional view showing a state after a force in a direction of lifting the seat is exerted, and FIG. 16(D) is a sectional view taken along a line XVID-XVID of FIG. 16(C). As the same components as those of the aforementioned embodiment are marked with the same numerals, detail description about the components will be omitted.

The embodiment shown in FIGS. 10(A), 10(B) is structured such that, when a large load acts on the vehicle seat in the lifting direction, for example, in the event of a vehicle collision, the load is received by the two bolts, i.e. the first and second stopper bolts 26, 28. On the other hand, this variation example is structured such that the load is received by only one bolt, i.e. the second stopper bolt 28 as shown in FIGS. 16(A), 16(B).

In the variation example, the second stopper bolt 28 is positioned on the center line between the front and rear rivets 15R and 15R for fastening the rear rail bracket 45 and the lower rail 15 and is perfectly fitted relative to the base frame 21. Further, the second stopper bolt 28 is loosely fitted in the elongate holes 49 of the rear rail bracket 45 and also loosely fitted in circular holes 9c formed in the both side walls of the seat bracket 9.

As a large force acts on the vehicle seat in the rising direction as mentioned above, as shown in FIGS. 16(C), 16(D), the lower rail 15 and the rear rail bracket 45 are slightly moved upwardly so that lower peripheral edges of the elongated holes 49 of the rear rail bracket 45 come in contact with the second stopper bolt 28. After that, the second stopper bolt 28 and the base frame 21 are also slightly moved upwardly. The second stopper bolt 28 comes in contact with upper peripheral edges of the circular holes 9c of the seat bracket 9 and thus pushes up the seat bracket 9.

In this manner, the large force acting on the vehicle seat is spread to be received by both the seat bracket 9 and the base frame 21. Therefore, the load acting on the base frame 21 is reduced.

Since the force acting on the vehicle seat is received only by the second stopper bolt 28, the first stopper bolt 26 can be omitted, that is, reducing the number of parts. Further, since the first stopper bolt 26 can be omitted, the configuration of the rear rail bracket 45 can be simplified such that it can be symmetrical about the position where the second stopper bolt 28 penetrates. Furthermore, since the second stopper bolt 28 is arranged at a position on the center line between the first and rear rivets 15R, 15R, no or little offset load or moment due to the offset load is exerted on the rear rail bracket 45. Therefore, since the load is applied nearly evenly to the front and rear rivets 15R, 15R, same rivets can be used for the front and rear rivets 15R, 15R, thus achieving the adaptability of parts. The other structure and other works and effects of the variation example are the same as those of the aforementioned embodiment.

Figure 17A:
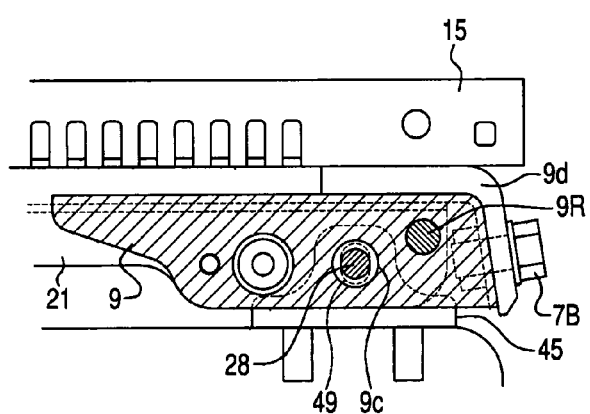
Figure 17B:
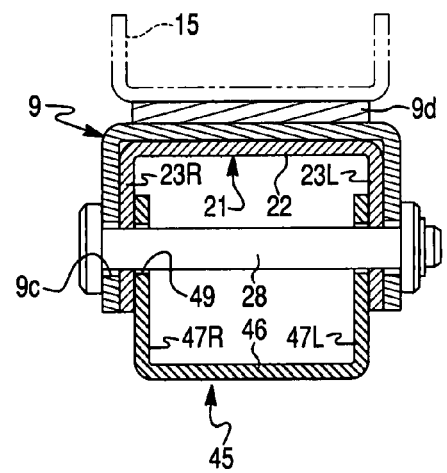
Figure 17C:
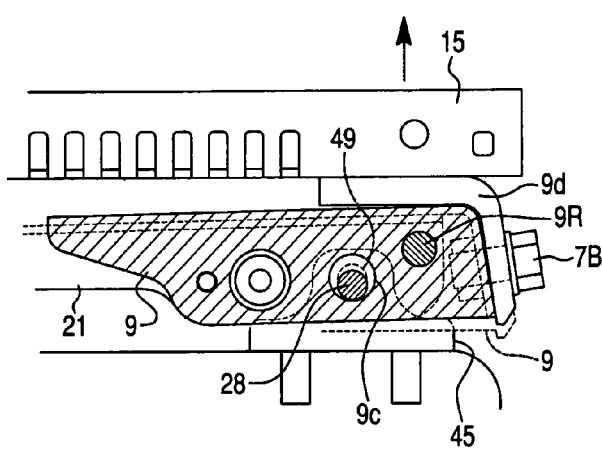
Figure 17D:
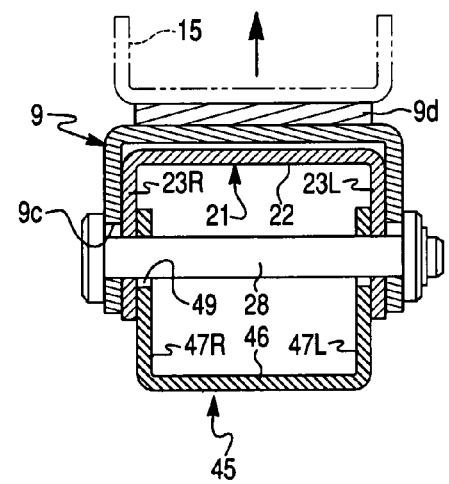

FIGS. 17(A)-17(D) show another variation example of the rear end portion of the base frame of the seat load measuring apparatus shown in FIGS. 10(A), 10(B), wherein FIG. 17(A) is a side sectional view showing the normal state, FIG. 17(B) is a sectional view taken along al line XVIIB-XVIIB of FIG. 17(A), FIG. 17(C) is a side sectional view showing a state after a force in a direction of lifting the seat is exerted, and FIG. 17(D) is a sectional view taken along a line XVIID-XVIID of FIG. 17(C). As the same components as those of the aforementioned examples are marked with the same numerals, detail description about the components will be omitted.

The embodiment shown in FIGS. 16(A) through 16(D) is structured such that the base frame 21 is fixed to the vehicle floor 7 via the seat bracket 9 and the rear rail bracket 45 is fixed to the lower rail 15. On the other hand, this variation example is structured such that the base frame 21 is fixed to the lower rail 15 via the seat bracket 9 and the rear rail bracket 45 is fixed to the vehicle floor 7 as shown in FIGS. 17(A) through 17(D). The other structure and other works and effects of the variation example are substantially the same as those of the aforementioned example shown in FIGS. 16(A)-16(D).

Figure 18:
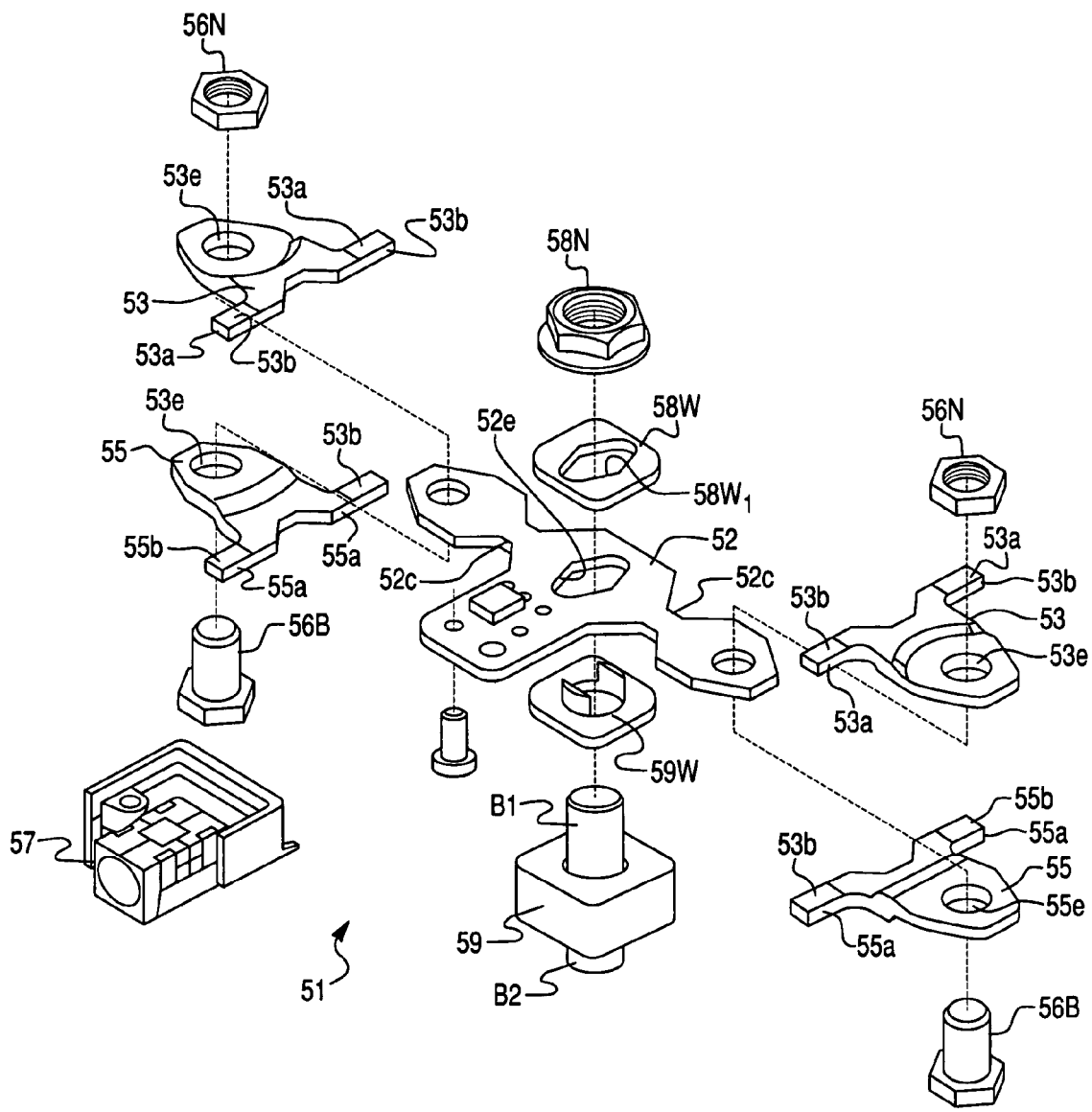
FIG. 18 is an exploded perspective view similar to FIG. 4, but showing a variation example of the sensor portion shown in FIG. 4.

FIG. 18 is an exploded perspective view similar to FIG. 4, but showing a variation example of the sensor portion shown in FIG. 4. As the same components as those of the aforementioned embodiment are marked with the same numerals, detail description about the components will be omitted. In the aforementioned sensor plate of the embodiment shown in FIG. 4, the hole of the washer 58W, the center hole 52e of the sensor plate 52, and the hole of the center washer 59W are each formed in a rectangular shape. In this variation example, however, the hole $58W_1$ of the washer 58W, the center hole 52e of the sensor plate 52, and the hole $59W_1$ of the center washer 59W are each formed in a circular shape as shown in FIG. 18. By forming the holes $58W_1$, $52e$, $59W_1$ into circular shape, the contact areas of the center washer 58W, the sensor plate 52, and the center washer 59W relative to the bolt B1 of the center post 59 when fitted are increased. Therefore, when the center nut 58N is screwed to fasten the bolt B1, the deformation of the center washer 58W, the sensor plate 52, and the center washer 59W can be prevented, thereby improving the stability. The other structure and other works and effects of the variation example are substantially the same as those of the aforementioned example.

FIGS. 19(A), 19(B) show a variation example of the sensor portion of the seat load measuring apparatus, wherein FIG. 19(A) is a partial plan view similar to FIG. 12 and FIG. 19(B) is a sectional view similar to FIG. 13, taken along a line XIXB-XIXB of FIG. 19(A). As the same components as those of the aforementioned example are marked with the same numerals, detail description about the components will be omitted. In the sensor portion of the aforementioned example shown in FIG. 12 and FIG. 13, the mounting structure of the sensor plate 52 relative to the base frame 21 are different from the mounting structure composed of the components shown in FIG. 4. In this variation example, however, the mounting structure of the sensor plate 52 relative to the base frame 21 is the same as the mounting structure composed of the components shown in FIG. 4, as shown in FIGS. 19(A), 19(B). The other structure and other works and effects of the variation example are substantially the same as those of the aforementioned example.

After the Z arm 61 and the front stopper bolt 26 are assembled in the base frame 21, the seat load measuring apparatus 10 and the lower rail 15 or the seat bracket 9 are riveted together. During this, the front stopper bolt 26 and the Z arm do not interfere the riveting work because the positions of the rivets are shifted from the front stopper bolt 26 and the front and rear ends of the Z arm 61.

As apparent from the aforementioned description, in a seat load measuring apparatus according to an exemplary embodiment of the invention, a cable for connecting a load sensor and a control unit can be designed to be detachable by employing a sensor-side connector and a cable-side connector, thereby achieving the adaptability of the load sensor and the connector casing relative to various kinds of motor vehicles. Only required is preparing a cable having a length corresponding to the kind of motor vehicle. Therefore, the seat load measuring apparatus can be easily and inexpensively adopted to various kinds of motor vehicles.

According to one embodiment of the present invention, by utilizing an opening of a protector which is formed in at least one side in any of the vertical direction, the longitudinal direction, the lateral direction, the diagonal direction from upper front to lower back or from lower front to upper back, the diagonal direction from upper left to lower right or from lower left to upper right, and the diagonal direction from forward left to backward right or from backward left to forward right, the load sensor can be effectively protected and the connection and disconnection between the load sensor and the cable can be facilitated. In addition, the seat load measuring apparatus can be easily and inexpensively adopted to various kinds of motor vehicles. Moreover, it is not required to form hole(s) and groove(s) for insertion of the cable-side connector, thus further simplifying the manufacture and reducing the cost.

Of course, the sensor-side connector and the cable-side connector can be delivered in the connected state. In addition, since the connectors are allowed to be connected during the assembly of a vehicle body by a car manufacturer, the connectors can be delivered separately. Moreover, the flexibility during manufacturing process is improved. In this manner, a seat load measuring apparatus which can be effectively adopted in various kinds of motor vehicles and is easier to install, maintain and manufacture can be provided.

Furthermore, according to one embodiment of the present invention the protector is formed just by bending a band-like plate. Therefore, the protector can be easily and inexpensively formed. Furthermore, according to one embodiment of the present invention, a protective mechanism is provided so as to withstand large load exerted on the mounting portion of the seat load measuring apparatus disposed between a vehicle seat and a vehicle floor by a moment in a direction of lifting the rear portion of the vehicle seat. In addition, the seat load measuring apparatus can be easily and inexpensively adopted to various kinds of motor vehicles.

The priority applications, Japanese Patent Application Nos. 2002-240096 filed on Aug. 21, 2002, 2002-324758 filed on Nov. 8, 2002, and 2003-191694, filed Jul. 4, 2003, are hereby incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat load measuring apparatus comprising:
    a load sensor for detecting a load which is applied to a vehicle seat by an occupant sitting on said vehicle seat;
    a base frame, upon which said load sensor is disposed, which is fixed to a seat bracket, having two side walls, connected to a vehicle floor;
    a plurality of front-side and rear-side rail brackets which are disposed near the front and rear ends of said base frame, respectively; and
    a stopper bolt tightly fitted to said base frame, loosely fitted into an elongate hole of said rear-side rail bracket and loosely fitted in circular holes formed in both side walls of said seat bracket, wherein the base frame and the seat bracket receive the load applied on said vehicle seat.

2. The apparatus of claim 1, wherein when the load applied between said base frame and said plurality of rail brackets exceeds a predetermined value, said stopper bolt directly transmits the excessive load between said base frame and said seat bracket.

3. The apparatus of claim 1, wherein a lower rail is fastened to said rear-side rail bracket with a front and rear rivet and slides in a longitudinal direction of the vehicle.

4. The apparatus of claim 1, wherein the stopper bolt is provided at one end with a hexagon head, at the other end with a threaded portion, and at the middle with a smooth cylindrical surface.

5. The apparatus of claim 3, wherein the stopper bolt is positioned on a center line between said front rivet and said rear rivet.

6. The apparatus of claim 1, further comprising a plurality of arms which are disposed on a front portion and a rear portion of said base frame, respectively to extend in the longitudinal direction, wherein each of said plurality of arms is provided at its one end with a press portion for transmitting force to a plurality of strain gauges and at its other end with a connecting portion relative to each of said plurality of rail brackets.

7. The apparatus of claim 6, wherein when the load applied between said base frame and said plurality of rail brackets exceeds a predetermined value, said stopper bolt directly transmits the excessive load between said base frame and said seat bracket not through said plurality of arms.

8. A seat load measuring apparatus comprising:
- a load sensor for detecting a load which is applied to a vehicle seat by an occupant sitting on said vehicle seat;
- a base frame, upon which said load sensor is disposed;
- a lower rail fastened to said base frame via a seat bracket, having two side walls;
- a plurality of front-side and rear-side rail brackets which are disposed near the front and rear ends of said base frame, respectively, wherein the rear-side rail bracket is fixed to a vehicle floor; and
- a stopper bolt tightly fitted to said base frame, loosely fitted into an elongate hole of said rear-side rail bracket and loosely fitted in circular holes formed in both side walls of said seat bracket, wherein the base frame and the seat bracket receive the load applied on said vehicle seat.

9. The apparatus of claim 8, wherein when the load applied between said base frame and said plurality of rail brackets exceeds a predetermined value, said stopper bolt directly transmits the excessive load between said base frame and said seat bracket.

10. The apparatus of claim 8, wherein the stopper bolt is provided at one end with a hexagon head, at the other end with a threaded portion, and at the middle with a smooth cylindrical surface.

11. The apparatus of claim 8, further comprising a plurality of arms which are disposed on a front portion and a rear portion of said base frame, respectively to extend in the longitudinal direction, wherein each of said plurality of arms is provided at its one end with a press portion for transmitting force to a plurality of strain gauges and at its other end with a connecting portion relative to each of said plurality of rail brackets.

12. The apparatus of claim 8, wherein when the load applied between said base frame and said plurality of rail brackets exceeds a predetermined value, said stopper bolt directly transmits the excessive load between said base frame and said seat bracket not through said plurality of arms.

* * * * *